US010409838B1

(12) United States Patent
George et al.

(10) Patent No.: US 10,409,838 B1
(45) Date of Patent: Sep. 10, 2019

(54) MANAGING REGISTRATION AND RESERVATION INFORMATION IN AN ACTIVE-ACTIVE CONFIGURATION

(71) Applicant: EMC IP Holding Company LLC, Hopkinton, MA (US)

(72) Inventors: Subin George, Framingham, MA (US); Svetlana O. Sokolova, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 624 days.

(21) Appl. No.: 15/074,037

(22) Filed: Mar. 18, 2016

(51) Int. Cl.
*G06F 16/27* (2019.01)
*G06F 16/23* (2019.01)
*G06F 3/06* (2006.01)
*G06F 11/20* (2006.01)

(52) U.S. Cl.
CPC .......... *G06F 16/275* (2019.01); *G06F 3/0635* (2013.01); *G06F 11/2069* (2013.01); *G06F 16/2358* (2019.01); *G06F 3/067* (2013.01)

(58) Field of Classification Search
CPC ...... G06F 3/067; G06F 3/0617; G06F 3/0635; G06F 3/0647; G06F 11/1662; G06F 11/20; G06F 11/2005; G06F 11/201; G06F 11/2092; G06F 13/14; G06F 2009/4557; G06F 3/061; G06F 3/0632; G06F 9/45558; G06F 3/06; G06F 11/2069; G06F 11/2071; G06F 11/2079; G06F 2201/81; H04L 67/1097

USPC ............ 710/36, 38, 74, 19, 20, 21, 31, 5, 7; 714/43, 4.12; 370/248, 252; 711/162, 711/114; 709/239
See application file for complete search history.

(56) References Cited

U.S. PATENT DOCUMENTS

| 5,544,347 | A | 8/1996 | Yanai et al. | |
|---|---|---|---|---|
| 5,742,792 | A | 4/1998 | Yanai et al. | |
| 6,968,369 | B2 | 11/2005 | Veprinsky et al. | |
| 7,054,883 | B2 | 5/2006 | Meiri et al. | |
| 7,272,674 | B1 * | 9/2007 | Nandi ................. | H04L 67/1097 370/216 |
| 8,301,812 | B1 * | 10/2012 | Riordan .............. | G06F 13/4022 709/225 |
| 8,335,899 | B1 * | 12/2012 | Meiri .................. | G06F 11/2076 711/162 |
| 8,626,967 | B1 * | 1/2014 | Naik ...................... | G06F 13/14 710/31 |

(Continued)

*Primary Examiner* — Dennis Truong
(74) *Attorney, Agent, or Firm* — Muirhead and Saturnelli, LLC

(57) ABSTRACT

Described are techniques for maintaining and using registration and reservation information in an active-active configuration that provides automated data replication of a logical device. Various commands may be issued from one or more hosts to read and modify registration and reservation information in the active-active configuration. Processing is performed to service the various commands and provide a host or client with a consolidated logical view of a data storage system including the logical device where the host is allowed to issue I/Os over multiple paths to the logical device. Depending on the command, such processing may include replicating or mirroring reservation state information between two data storage systems each including a different device configured as the logical device.

19 Claims, 14 Drawing Sheets

(56) References Cited

U.S. PATENT DOCUMENTS

| | | | | |
|---|---|---|---|---|
| 8,832,325 B1* | 9/2014 | George | ............... | G06F 3/0617 |
| | | | | 709/231 |
| 8,880,821 B1* | 11/2014 | Li | ............... | G06F 3/061 |
| | | | | 711/162 |
| 8,909,980 B1* | 12/2014 | Lewis | ............... | G06F 11/00 |
| | | | | 714/4.11 |
| 8,949,656 B1* | 2/2015 | Ninan | ............... | G06F 11/2005 |
| | | | | 714/4.1 |
| 2003/0188218 A1* | 10/2003 | Lubbers | ............... | G06F 11/2058 |
| | | | | 714/5.11 |
| 2005/0278465 A1* | 12/2005 | Qi | ............... | G06F 13/387 |
| | | | | 710/36 |
| 2014/0059302 A1* | 2/2014 | Hayakawa | ............... | G06F 3/0644 |
| | | | | 711/153 |

* cited by examiner

| Name | Description |
|---|---|
| Write Exclusive | Access Restrictions: Some commands (e.g., media-access write commands) are only allowed for the persistent reservation holder<br>Persistent Reservation Holder: There is only one persistent reservation holder. |
| Exclusive Access | Access Restrictions: Some commands (e.g., media-access commands) are only allowed for the persistent reservation holder<br>Persistent Reservation Holder: There is only one persistent reservation holder. |
| Write Exclusive — Registrants Only | Access Restrictions: Some commands (e.g., media-access write commands) are only allowed for registered I_T nexuses.<br>Persistent Reservation Holder: There is only one persistent reservation holder. |
| Exclusive Access — Registrants Only | Access Restrictions: Some commands (e.g., media-access commands) are only allowed for registered I_T nexuses.<br>Persistent Reservation Holder: There is only one persistent reservation holder. |
| Write Exclusive — All Registrants | Access Restrictions: Some commands (e.g., media-access write commands) are only allowed for registered I_T nexuses.<br>Persistent Reservation Holder: Each registered I_T nexus is a persistent reservation holder |
| Exclusive Access — All Registrants | Access Restrictions: Some commands (e.g., media-access commands) are only allowed for registered I_T nexuses.<br>Persistent Reservation Holder: Each registered I_T nexus is a persistent reservation holder |

MANAGING REGISTRATION AND RESERVATION INFORMATION IN AN ACTIVE-ACTIVE CONFIGURATION

BACKGROUND

Technical Field

This application generally relates to data storage.

Description of Related Art

Systems may include different resources used by one or more host processors. Resources and host processors may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O operations in connection with data requests, such as data read and write operations.

Host processor systems may store and retrieve data from a data storage system containing a plurality of host interface units, disk drives, and disk interface units. Such data storage systems are provided, for example, by EMC Corporation of Hopkinton, Mass. The host systems access storage devices on the data storage system through a plurality of channels provided therewith. Host systems provide data and access control information through the channels to the data storage system and the data storage system also provides data to the host systems through the channels. The host systems do not address the disk drives of the data storage system directly, but rather, access what appears to the host systems as a plurality of logical disk units, logical devices, or logical volumes. The logical disk units may or may not correspond to the actual disk drives. Allowing multiple host systems to access the logical volumes allows the host systems to share data stored therein.

SUMMARY OF THE INVENTION

In accordance with one aspect of techniques herein is a method of processing commands comprising: receiving, from an initiator, a first command over a first of a plurality of paths, the first command being directed to a logical device, wherein each of a first device of a first data storage system and a second device of a second data storage system is configured as the logical device, wherein the plurality of paths to the logical device includes the first path from the initiator to a first target port of the first data storage system and includes a second path to a second target port of the second data storage system; determining whether the first command modifies any of registration and reservation state information and whether the first command is to be replicated on the second data storage system; responsive to determining that the first command modifies any of registration and reservation state information, performing first processing in accordance with the first command to update a first data container of the first data storage system, the first data container including registration and reservation information for the first data storage system; and responsive to determining that the first command is to be replicated on the second data storage system, performing second processing in accordance with the first command to update a second data container of the second data storage system, the second data container including registration and reservation information for the second data storage system. The first command may request creation of a registration for the logical device, the initiator and the first target port, and the registration may be associated with a first key of the first command. It may be determined that the first command modifies registration information for the logical device and it may be determined that the first command is not to be replicated on the second data storage system. The method may include performing said first processing including executing the first command on the first data storage system to update the first data container to indicate creation of the registration for the logical device and wherein the registration is associated with the first key, and wherein said second processing is not performed, the first command is not executed on second data storage system, and the second data container on the second data storage system is not updated in accordance with the first command. The first command may modify reservation information for the logical device. It may be determined that the first command modifies reservation information for the logical device and it may be determined that the first command is to be replicated on the second data storage system. The method may include performing said first processing including executing the first command on the first data storage system to update reservation information of the first data container; and performing said second processing including: sending a request from the first data storage system to the second data storage system to execute the first command; and executing the first command on the second data storage system to update reservation information of the second data container. The request may be sent over a connection used for remote data replication by a remote data facility that automatically replicates changes of the first device to the second device, and automatically replicates changes of the second device to the first device. The first command may be any of a command to create a reservation for the logical device, release a reservation for the logical device, preempt an existing reservation for the logical device, and clear reservation and registration information for the first device. The first command may include a first key, the first data container may include a first registration of the first path for the logical device, the second data container may include a second registration of the second path for the logical device, and each of the first registration and the second registration may be associated with the first key. The command may be a command to create a reservation for the logical device, and the first processing may include determining whether there is a matching existing registration in the first data container matching one or more criteria including the first key; and responsive to determining that the first registration is the matching existing registration, executing the first command on the first data storage system that updates reservation information in the first data container for the logical device to indicate a first reservation on the first path for the logical device, said first reservation being associated with the first key. The second processing may include determining whether there is a second matching existing registration in the second data container matching one or more criteria including the first key; and responsive to determining that the second registration is the second matching existing registration, executing the first command on the second data storage system that updates reservation information in the second data container for the logical device to indicate a second reservation on the second path for the logical device, said second reservation being associated with the first key. The first command may be any of a command to release a reservation for the logical device, preempt an existing reservation for the logical device, and clear reservation and registration information for the first device, and wherein the first processing may include determining whether there is a matching existing reservation in the first data container matching one or more criteria including the first key; and responsive to determining that the first registration is the matching existing reservation, executing the first command on the first data storage system that updates reservation information in the first data container for the logical device to indicate the matching existing reservation is released. The second processing may include determining whether there is a second matching existing reservation in the second data container matching one or more criteria including the first key; and responsive to determining that the second reservation is the second matching existing reservation, executing the first command on the second data storage system that updates reservation information in the second data container for the logical device to indicate the second matching existing reservation is released. The method may include determining whether the first command is a command to read registration and reservation information for the logical device; and responsive to determining the first command is a command to read registration and reservation information for the logical device, performing third processing comprising: obtaining from the first data container first registration and reservation information for the logical device; sending a request from the first data storage system to the second data storage system to return second registration and reservation information for the logical device; receiving, at the first data storage system from the second data storage system, the second registration and reservation information for the logical device; and returning a response to the initiator, said response including the first registration and reservation information and the second registration and reservation information. The initiator may be included in a first host. The first host may be a member of a cluster including the first host and one or more other hosts. The second path may be a path from a second initiator to the second target port, and the second initiator may be included any of the first host and another host of the cluster. The method may include registering the first path to the logical device using a first key; and registering the second path to the logical device using the first key, wherein the first command specifies to use the first key in connection with performing an operation for any of existing registrations and existing reservations associated with criteria including the first key.

In accordance with another aspect of the techniques herein is a system comprising a processor; and a memory including code stored therein that, when executed, performs a method of processing commands comprising: receiving, from an initiator, a first command over a first of a plurality of paths, the first command being directed to a logical device, wherein each of a first device of a first data storage system and a second device of a second data storage system is configured as the logical device, wherein the plurality of paths to the logical device includes the first path from the initiator to a first target port of the first data storage system and includes a second path to a second target port of the second data storage system; determining whether the first command modifies any of registration and reservation state information and whether the first command is to be replicated on the second data storage system; responsive to determining that the first command modifies any of registration and reservation state information, performing first processing in accordance with the first command to update a first data container of the first data storage system, the first data container including registration and reservation information for the first data storage system; and responsive to determining that the first command is to be replicated on the second data storage system, performing second processing in accordance with the first command to update a second data container of the second data storage system, the second data container including registration and reservation information for the second data storage system.

In accordance with another aspect of techniques herein is a computer readable medium comprising code stored thereon that, when executed, performs a method of processing commands comprising: receiving, from an initiator, a first command over a first of a plurality of paths, the first command being directed to a logical device, wherein each of a first device of a first data storage system and a second device of a second data storage system is configured as the logical device, wherein the plurality of paths to the logical device includes the first path from the initiator to a first target port of the first data storage system and includes a second path to a second target port of the second data storage system; determining whether the first command modifies any of registration and reservation state information and whether the first command is to be replicated on the second data storage system; responsive to determining that the first command modifies any of registration and reservation state information, performing first processing in accordance with the first command to update a first data container of the first data storage system, the first data container including registration and reservation information for the first data storage system; and responsive to determining that the first command is to be replicated on the second data storage system, performing second processing in accordance with the first command to update a second data container of the second data storage system, the second data container including registration and reservation information for the second data storage system.

BRIEF DESCRIPTION OF THE DRAWINGS

Features and advantages of the present invention will become more apparent from the following detailed description of exemplary embodiments thereof taken in conjunction with the accompanying drawings in which:

FIG. 10 is an example of different types of I/O access that may be used in an embodiment in accordance with techniques herein.

DETAILED DESCRIPTION OF EMBODIMENT(S)

Figure 1:
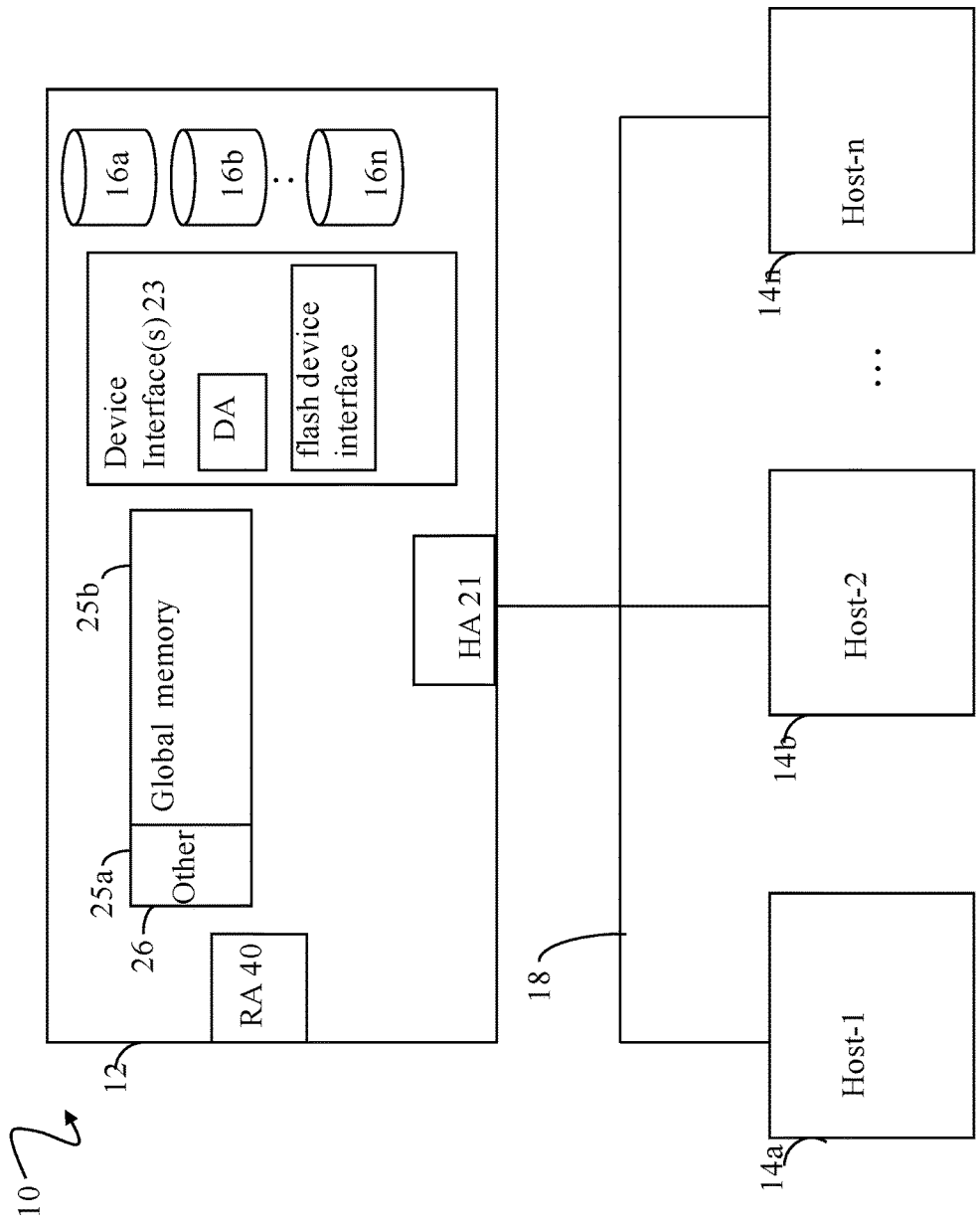
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device. Generally, elements 16a-16n may denote any suitable non-volatile data storage device or medium upon which data may be stored and retrieved.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25*b*, for example, when communicating with other device interfaces and other components of the data storage array. The other portion 25*a* is that portion of memory that may be used in connection with other designations that may vary in accordance with each embodiment.

The particular data storage system as described in this embodiment, or a particular device thereof, such as a rotating disk drive or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16*a*-16*n* of the storage systems directly, but rather access to data may be provided to one or more host systems from what the host systems view as a plurality of logical devices or logical volumes (LVs) which may also be referred to as logical units (e.g., LUNs). The LUNs may or may not correspond to the actual physical devices or drives 16*a*-16*n*. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16*a*-16*n*. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16*a*-16*n*.

Figure 2:
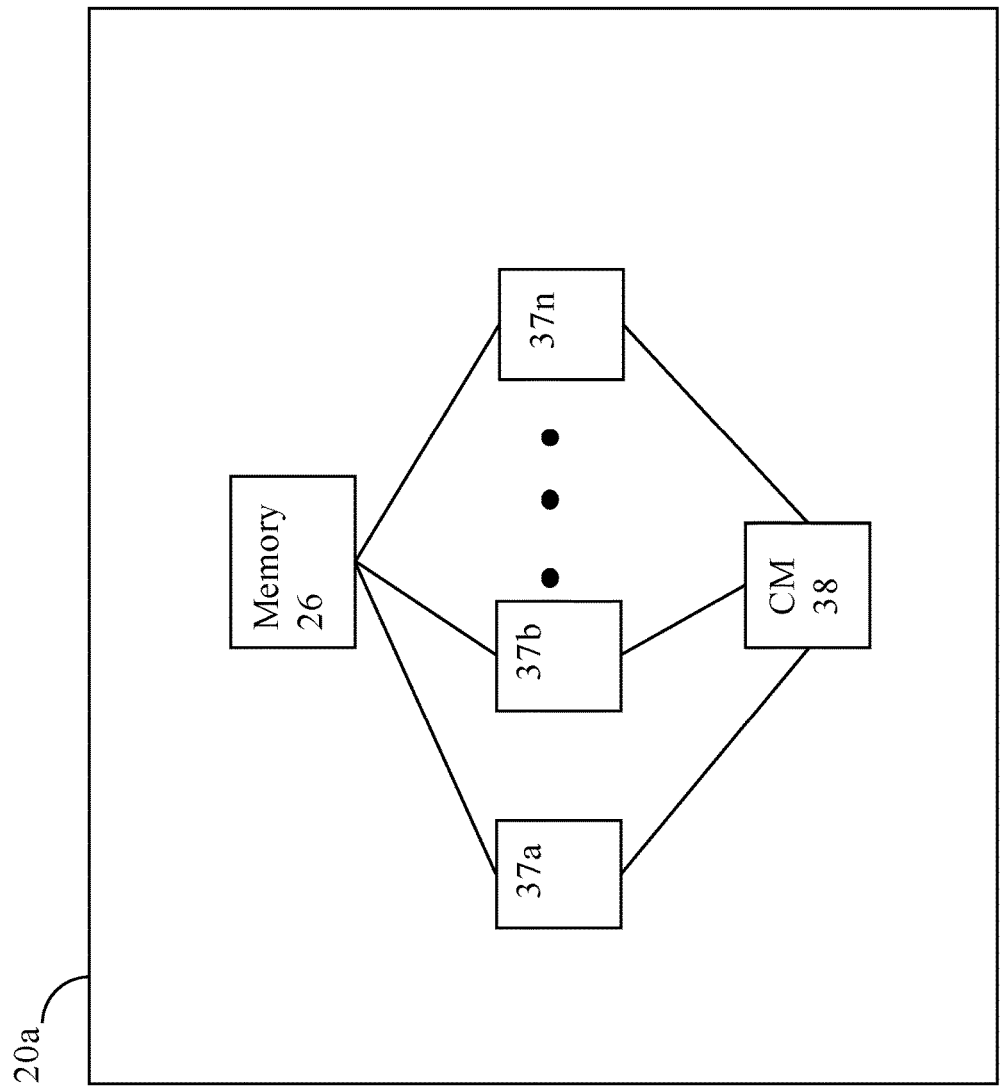
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37*a*-37*n* coupled to the memory 26. Each of the directors 37*a*-37*n* represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

With reference back to FIG. 1, components of the data storage system may communicate using GM 25*b*. For example, in connection with a write operation, an embodiment may first store the data in cache included in a portion of GM 25*b*, mark the cache slot including the write operation data as write pending (WP), and then later destage the WP data from cache to one of the devices 16*a*-16*n*. An acknowledgement regarding the write completion may be returned to the host or other client issuing the write operation after the write data has been stored in cache. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host. An I/O operation such as a read or write operation received from a host may be directed to a LUN and a location or offset (e.g., such as a logical block address (LBA)) of the LUN.

As described above, the data storage system 12 may be a data storage array including a plurality of data storage devices 16*a*-16*n* in which one or more of the devices 16*a*-16*n* are flash memory devices employing one or more different flash memory technologies. In one embodiment, the data storage system 12 may be a Symmetrix® VMAX® data storage array by EMC Corporation of Hopkinton, Mass. In the foregoing data storage array, the data storage devices 16*a*-16*n* may include a combination of rotating disk drives and flash drives. The flash devices may be constructed using nonvolatile semiconductor NAND flash memory. The flash devices may include one or more SLC (single level cell) devices and/or MLC (multi level cell) devices.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. In at least one embodiment of a data storage system in accordance with techniques herein, the data storage system may include multiple CPU "cores" or processors partitioned to function as the different components, such as DAs, FAs, RAs and the like, and to perform tasks handled by such components. For example, a number of CPU processors or cores may be configured to function as DAs and read data from physical storage and write data to physical storage (e.g., performing back end I/O operations and processing tasks denoting a back end I/O workload). As another example, a number of CPU processors or cores may be configured to function as FAs and receive external I/Os such as from hosts or other clients of the data storage system (e.g. where such processors perform processing and handling of front end I/O operations denoting a front end I/O workload). The various CPU processors or cores may have their own memory used for communication between other CPU processors or cores rather than utilize a global memory accessible to all storage processors. In such embodiments, memory 26 may represent memory of the CPU processors or cores.

With reference back to FIG. 1, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix® Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Figure 3:
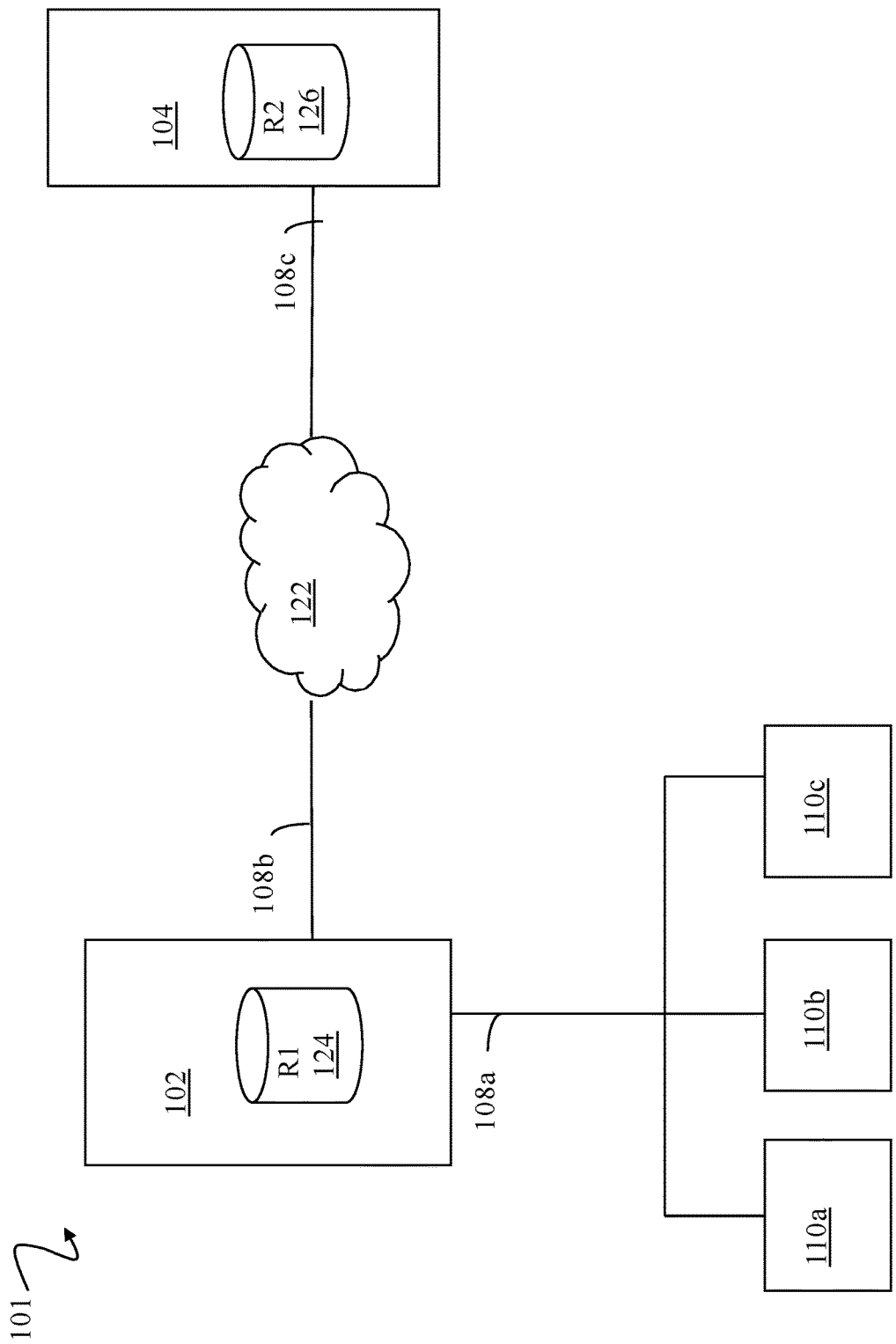
FIGS. 3 and 4 are examples illustrating active-passive remote replication configurations.

Referring to FIG. 3, shown is an example of an embodiment of a system 101 in an active-passive configuration. It should be noted that the embodiment illustrated in FIG. 3 presents a simplified view of some of the components illustrated in FIG. 1, for example, including only some detail of the data storage systems 12 for the sake of illustration.

Included in the system 101 are data storage systems 102 and 104 and hosts 110a, 110b and 210c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

Consistent with description herein, the data storage systems 102 and 104 may include one or more data storage devices. In this example, data storage system 102 includes storage device R1 124 and data storage system 104 includes storage device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 210a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix® data storage systems using SRDF® is described, for example, in U.S. Pat. Nos. 5,742,792, 5,544,347, 7,054,883, and 8,335,899, all of which are incorporated by reference herein in their entirety. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 2110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b, 108c to network 122. Data storage system 104 may include one or more RAs for use in receiving the communications from the data storage system 2102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein in its entirety. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

In at least one embodiment in accordance with techniques herein described in more detail below, data replication may be performed in a synchronous manner such as using SRDF® operating in a synchronous mode (SRDF®/S). With synchronous mode data replication, a host 110a may issue a write to the R1 device 124. The primary or R1 data storage system 102 may store the write data in its cache at a cache location and mark the cache location as including write pending (WP) data as mentioned elsewhere herein. The remote data replication facility operating in synchronous mode, such as SRDF®/S, may propagate the write data across an established RDF link (more generally referred to as a the remote replication link or link) such as over 108b, 122, and 108c, to the secondary or R2 data storage system 104 where the write data may be stored in the cache of the system 104 at a cache location that is marked as WP. Once the write data is stored in the cache of the system 104 as described, the R2 data storage system 104 may return an acknowledgement to the R1 data storage system 102 that it has received the write data. Responsive to receiving this acknowledgement from the R2 data storage system 104, the R1 data storage system 102 may return an acknowledgement to the host 110a that the write has been received and completed. Thus, generally, R1 device 124 and R2 device 126 may be logical devices, such as LUNs, configured as mirrors of one another. R1 and R2 devices may be, for example, fully provisioned LUNs, such as thick LUNs, or may be LUNs that are thin or virtually provisioned logical devices.

Figure 4:
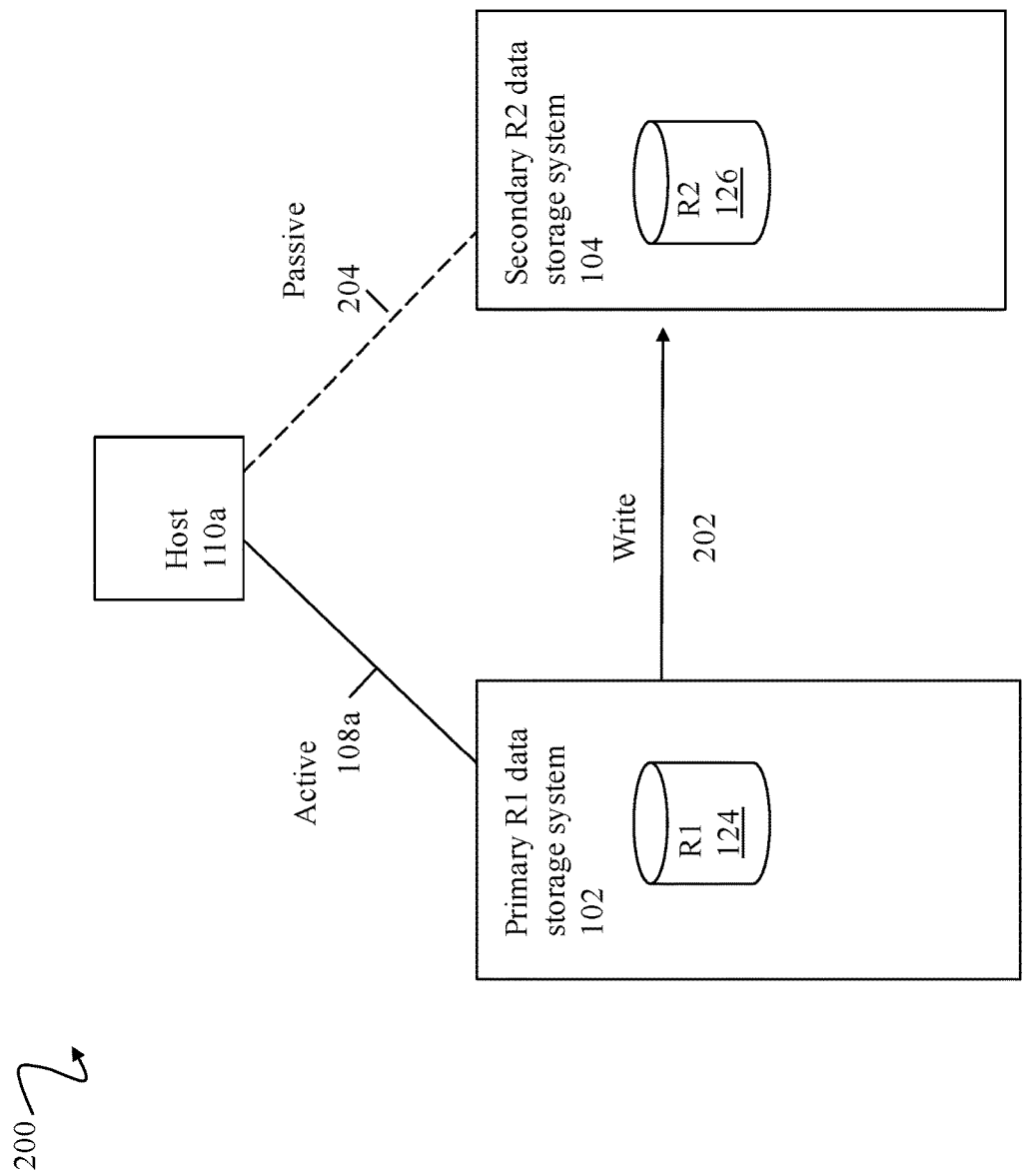

With reference to FIG. 4, shown is a further simplified illustration of components as described in connection with FIG. 3 with a single host 110a. It should be noted that element 202 generally represents the replication link used in connection with sending write data from the primary R1 data storage system 102 to the secondary R2 data storage system 104. It should be noted that link 202, more generally, may also be used in connection with other information and communications exchanged between 102 and 104 for replication. As mentioned above, when operating in synchronous replication mode, host 110a issues a write, or more generally, all I/Os including reads and writes, over a path to only the primary R1 data storage system 102. The host 110a does not issue I/Os directly to the R2 data storage system 104. The configuration of FIG. 4 may also be referred to herein as an active-passive configuration used with synchronous replication where the host 110a has an active connection or path 108a over which all I/Os are issued to only the R1 data storage system. The host 110a may have a passive connection or path 204 to the R2 data storage system 104. In the configuration of 200, the R1 device 124 and R2 device 126 may be configured and identified as the same LUN, such as LUN A, to the host 110a. Thus, the host 110a may view 108a and 204 as two paths to the same LUN A where path 108a is active (over which I/Os may be issued to LUN A) and where path 204 is passive (over which no I/Os to the LUN A may be issued). Should the connection 108a and/or the R1 data storage system 102 experience a failure or disaster whereby access to R1 124 configured as LUN A is unavailable, processing may be performed on the host 110a to modify the state of path 204 to active and commence issuing I/Os to the R2 device configured as LUN A. In this manner, the R2 device 126 configured as LUN A may be used as a backup accessible to the host 110a for servicing I/Os upon failure of the R1 device 124 configured as LUN A. The configuration in FIG. 4 may be referred to as an active-passive RDF configuration and may be contrasted with an active-active RDF configuration as will be described in connection with FIG. 5. In such an embodiment, LUN A may have a first identity or identifier, such as a unique world wide name (WWN) and both the R1 and the R2 devices may be configured to have the same first identity or identifier.

Figure 5:
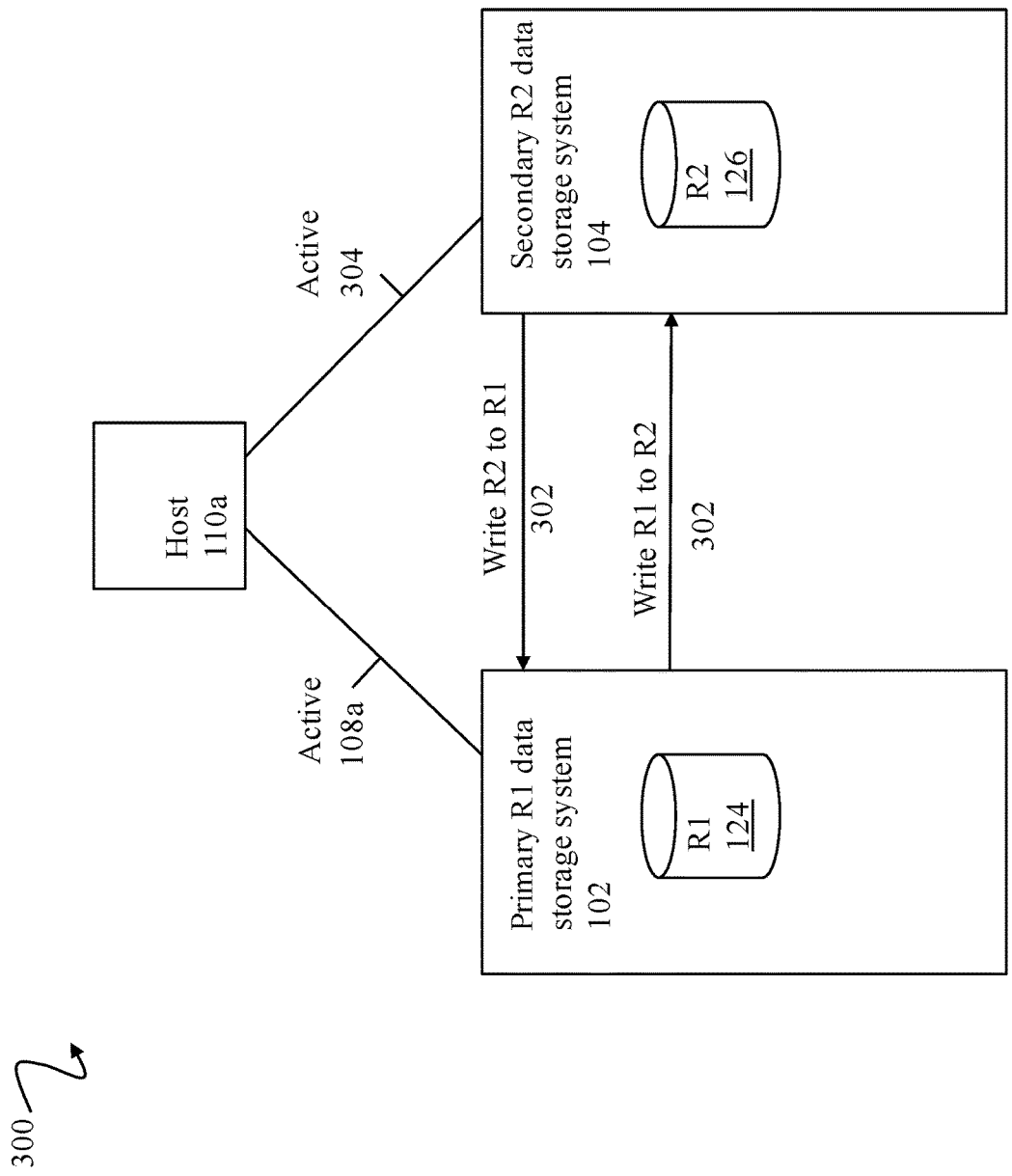
FIG. 5 is an example illustrating an active-active remote replication configuration.

Referring to FIG. 5, shown is another configuration of components that may be used in an embodiment in accordance with techniques herein. The example 300 illustrates an active-active configuration in connection with synchronous replication as may be used in an embodiment in accordance with techniques herein. In an active-active configuration with synchronous replication, the host 110a may have a first active path 108a to the R1 data storage system and R1 device 124 configured as LUN A. Additionally, the host 110a may have a second active path 304 to the R2 data storage system and R2 device 126 configured as LUN A. From the view of the host 110a, paths 108a and 304 appear as 2 paths to the same LUN A as described in connection with FIG. 3 with the difference that the host in the example 300 configuration may issue I/Os, both reads and/or writes, over both of paths 108a and 304. The host 110a may send a first write over path 108a which is received by the R1 system 102 and written to cache of the R1 system 102 where, at a later point in time, the first write is destaged from the cache of the R1 system 102 to physical storage provisioned for the R1 device 124 configured as LUN A. The R1 system 102 also sends the first write to the R2 system 104 over link 302 where the first write is written to cache of the R2 system 104, where, at a later point in time, the first write is destaged from the cache of the R2 system 104 to physical storage provisioned for the R2 device 126 configured as LUN A. Once the first write is written to the cache of the R2 system 104, the R2 system 104 sends an acknowledgement over link 302 to the R1 system 102 that it has completed the first write. The R1 system 102 then returns an acknowledgement to host 110a over path 108a that the first write has completed. It should be noted that element 302 denotes a single link used in connection with sending writes from 102 to 104 and also from 104 to 102 as discussed above. However, an embodiment may use more than one link in connection with communications sent between systems 102 and 104.

The host 110a may also send a second write over path 304 which is received by the R2 system 104 and written to cache of the R2 system 104 where, at a later point in time, the second write is destaged from the cache of the R2 system 104 to physical storage provisioned for the R2 device 126 configured as LUN A. The R2 system 104 also sends the second write to the R1 system 102 over a second link 302 where the second write is written to cache of the R1 system 102, and where, at a later point in time, the second write is destaged from the cache of the R1 system 102 to physical storage provisioned for the R1 device 124 configured as LUN A. Once the second write is written to the cache of the R1 system 102, the R1 system 102 sends an acknowledgement over link 302 to the R2 system 104 that it has completed the second write. The R2 system 104 then returns an acknowledgement to host 110*a* over path 304 that the second write has completed.

Effectively, the active-active configuration, such as may be used with synchronous replication as in FIG. 5 or any other supported suitable mode such as synchronous replication, has the R2 system 104 act as another primary data storage system which facilitates propagation of writes received at the data storage system 104 to the data storage system 102. It should be noted that although FIG. 4 illustrates for simplicity a single host accessing both the R1 device 124 and R2 device 126, any number of hosts may access one or both of the R1 device 124 and the R2 device 126.

To further illustrate techniques herein, an embodiment will be described as illustrated in FIG. 5 where two data storage systems are exporting the same device, such as the same LUN, to the host as with active-active RDF where the host may issue I/Os to the LUN over two paths. Furthermore, rather than have a single host system or multiple hosts acting individually in a non-clustered environment, following examples illustrate use of techniques herein with a clustered host environment. It should be noted that techniques herein are not restricted to use with a clustered host environment and may be used in other suitable environments, such as with multiple individual hosts in a non-clustered environment, or a mixed environment with a cluster of hosts as well as individual hosts, multiple host clusters, and the like.

In connection with an embodiment in accordance with techniques herein, communications between an initiator port of the host (e.g., an initiator port of a host bus adapter of a host) and a target port of a data storage system (e.g., target port of an HA) may include those related to I/O operations and other non-I/O commands such as related to host control operations. I/O operations may include, for example, read and write operations.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having one or more ports) and a second endpoint which is a target port of an HA in the data storage system. Over each such path, one or more LUNs may be visible or exposed to the host initiator through the target port of the data storage system.

With respect to FIG. 5, element 108*a* may denote a path from an initiator port of the host 110*a* to a target port of data storage system 102 over which I/O commands may be issued from host 110*a* to the LUN (where the R1 logical device 124 is configured as the LUN), and element 304 may denote a path from an initiator port of host 110*a* to a target port of data storage system 104 over which commands may be issued by from host 110*a* to the same LUN (where the R2 logical device 126 is configured as the same LUN as R1 124).

Figure 6:
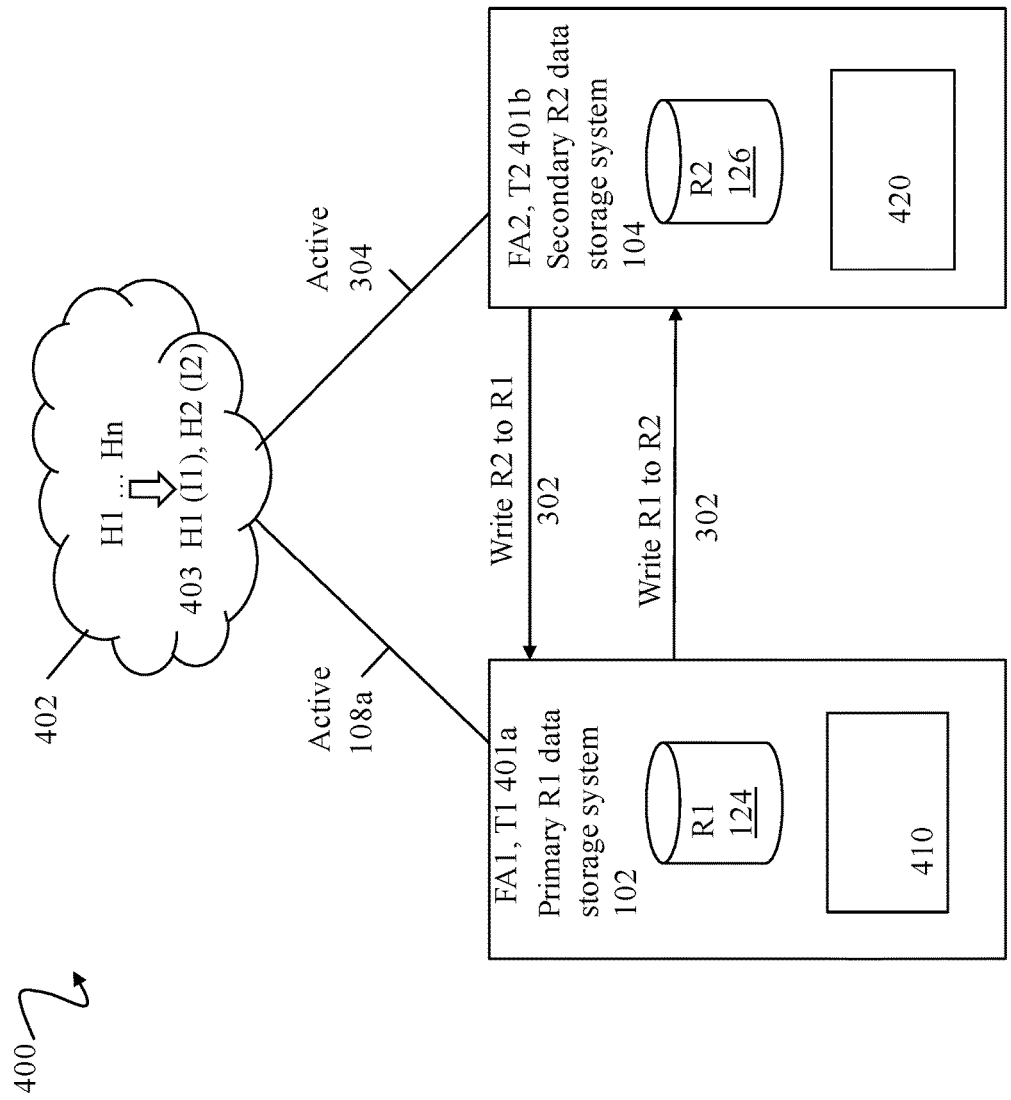
FIGS. 6, 7, 8, 9, 11, 12 and 13 are examples illustrating data flow, components, and information that may be used in embodiments in accordance with techniques herein.

Referring to FIG. 6, shown is another example of components that may be included in an embodiment in accordance with techniques herein. The example 400 includes components similar to those as described in connection with the active-active replication environment FIG. 5 with the difference that rather than have a single host 110*a* as in FIG. 5, FIG. 6 illustrates an embodiment including a cluster 402 of hosts H1 through Hn, where each of the Hi, i≤1≤n, denotes a host of the cluster. As known in the art, a host cluster or server cluster is a group of independent servers running an operating system and working together as single system or logical entity to provide high availability of services. When a failure occurs on one host of the cluster 402, resources are redirected and the workload of the failing host may be redistributed among one or more other hosts of the cluster 402. In an active-active replication environment such as illustrated in FIG. 6 and described above, each of the hosts of the cluster 402 may be unaware of the fact that there are multiple data storage systems 102, 104 and may simply view each of the paths 108*a* and 304 as different paths over which I/Os may be issued to the same LUN configured as R1 124 and R2 126.

Additionally shown in the example 400 of FIG. 6 are registration databases 410 and 420 that may be used in storing SCSI-based registration and reservation information as will be described in more detail below. Generally, in a manner similar to mirroring writes to the LUN between both data storage systems 102 and 104, reservation state also needs to be replicated or mirrored between both system 102 and 104. For example, additional operations and associated data affecting reservation state also need to be replicated or mirrored between both system 102 and 104. In particular, operations, such as SCSI-based commands and associated data related to device reservations of the LUN (e.g., having both an R1 device 124 in the data storage system 102 and an R2 device 126 in the data storage system 126 configured as the same LUN), also need to mirrored or replicated on both data storage systems 102 and 104.

Described in following paragraphs are techniques that may be used in connection with providing support in active-active environments for registration and reservation information. It should be noted that elements 410 and 420 denote databases which store registration and reservation state information in an embodiment in accordance with techniques herein. More generally, element 410 and 420 may be characterized as any suitable data containers which can store the information as described herein.

FIG. 6 includes element 402 generally illustrating a cluster with N hosts. For simplification in illustration, following paragraphs refer to a cluster 402 including only 2 hosts H1 and H2 as denoted by element 403. Additionally, assume that each of the hosts H1 and H2 include only a single initiator port. As also represented by element 403, let I1 denote the initiator port of H1 and I2 denote the initiator port of H2.

Generally, each of the data storage systems 102 and 104 may have any number of FAs (or HAs) each having one or more target ports. However, in this example for purposes of simplification of illustration, each of the systems 102 and 104 may include a single FA with a single target port. With reference to element 401*a*, data storage system 102 may include a single FA, denoted FA1, with a single target port, denoted T1. Similarly, with reference to element 401*b*, data storage system 104 may include a single FA, denoted FA2, with a single target port, denoted T2.

Further, assume that LUN A has its data automatically replicated or mirrored in a continuous manner using RDF as described above whereby R1 124 is configured as LUN A and R2 126 is configured as LUN a so that each of the hosts H1 and H2 view paths 108*a* and 304 as 2 different paths to the same LUN A.

What will be described in following paragraphs are techniques that may be performed in an embodiment such as illustrated in FIG. 6 in connection with SCSI-based reservations and associated comments which perform different operations on the registration database, such as databases 410 and 420. For example, SCSI-2 and SCSI-3 are versions of the SCSI standard that support device registrations and reservations and have various commands that perform operations affecting device registrations and reservations. For example, SCSI-3 has persistent reservation (PR) commands.

As illustrated below, commands may perform operations with respect to information in the registration databases 410 and 420 and may include commands that, for example, perform a registration, read information from the registration databases, perform a reservation, perform a clear operation to clear a reservation, perform a release to release a reservation, and perform processing to preempt a reservation. SCSI PR uses a concept of registration and reservation. Persistent reservations allow multiple hosts, or more generally multiple initiators, to communicate with a target by tracking multiple initiator-to-target relationships called I_T nexuses. An I_T nexus is a relationship between a specific SCSI initiator port (I) and a specific SCSI target port (T) for a given LUN within the SCSI target.

It should be noted that following examples may refer to SCSI PR commands such as in a SCSI-3 based system. However, similar commands and/or operations may be performed in other embodiments based on other versions of the SCSI standard which also affect reservation state information.

As a first step in setting up a Persistent Reservation, registration is performed of a Reservation Key, also more generally referred to herein as simply a "key". A key may generally be any suitable value, such as a numeric value. Each host system that participates registers a key with each LUN over each path (e.g., each initiator (I) and target port (T) pairing) over which the particular LUN is accessible to the host. In an embodiment having a host cluster arrangement, each host of the cluster may register on all paths over which a particular LUN is accessible using the same key. For example, assume that path 108*a* is from initiator I1 of host H1 to T1, path 304 is from initiator I2 of host H2 to T2 and that both paths 108*a* and 304 are active with respect to LUN A (e.g., I/Os to LUN A are allowed over both 108*a* and 304). In such a case, I1 may register over path I1-T1 to access LUN A using a first key and I2 may register over path I2-T2 to access LUN A using the same first key. As a variation with the host cluster including hosts H1 and H2, assume that path 108*a* is from initiator I1 of host H1 to T1, path 304 is from initiator I1 of host H1 to T2 and that both paths 108*a* and 304 are active with respect to LUN A (e.g., I/Os to LUN A are allowed over both 108*a* and 304). In such a case, I1 may register over path I1-T1 to access LUN A using a first key and I1 may register over path I1-T2 to access LUN A using the same first key.

As an alternative, to having multiple hosts use the same key to register over multiple paths to the same LUN, each host may use a different key. Having each host use its own key to register over its own paths for accessing a particular LUN may be performed in a cluster environment or in an embodiment in which hosts H1 and H2 operate independently in that they are not part of the same host cluster. For example, consider a case with hosts H1 and H2 where there are 4 active paths to LUN A-I1-T1, I1-T2, I2-T1 and I2-T2. In this case, initiator I1 may register over paths I1-T1 and I1-T2 to access LUN A using a first key and initiator I2 may register over paths I2-T1 and I2-T2 to access LUN A using a second key different from the first.

Thus, in a host cluster, an embodiment may have all hosts (e.g., all initiators) register over all paths to the same LUN using the same key where the key may be used to identify all paths to the same LUN. Alternatively, where each host (or each initiator) registers with a different key over all its own paths to the same LUN, all registrations having the same key may denote all paths from a particular host or initiator to the LUN.

In one embodiment, registration of PR keys may be performed by the hosts H1 and H2 as part of discovery processing whereby various devices and connections visible or accessible to the hosts H1 and H2 are discovered. As part of host discovery processing, each of the hosts H1 and H2 may register a key for each LUN accessible to the host over each path which the LUN is accessible. In following examples, consider an embodiment in which each host uses its own set of keys. Thus, a Reservation Key may be registered for each I_T nexus (each I-T over which a LUN is accessible to the initiator I) and includes the necessary information to allow the authentication of the I_T nexus devices in order to control the reservations.

Figure 7:
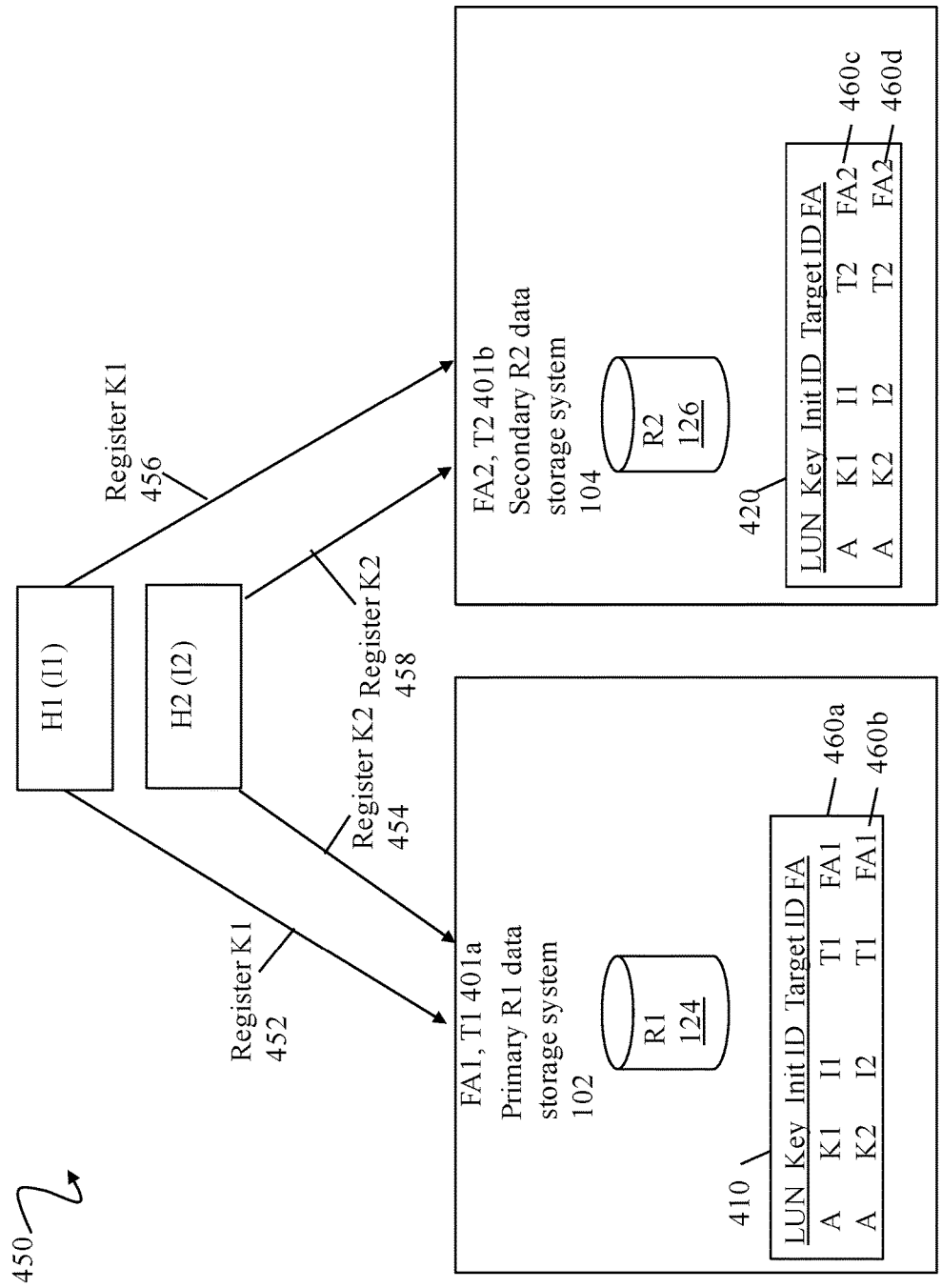

Referring to FIG. 7, shown is an example illustrating registration commands that may be issued by the hosts in an embodiment in accordance with techniques herein in an active-active configuration. The example 450 includes host H1 with initiator I1 and host H2 with initiator I2 as described in connection with FIG. 6. The hosts H1 and H2 may be in a cluster configuration as described in connection with FIG. 6.

In this active-active configuration of FIG. 7, it should be noted that there may be the following 4 active paths over which LUN A is accessible and over which I/Os may be issued: a first active path from I1-T1, from host H1 to data storage system 102, a second active path from I1-T2, from host H2 to data storage system 104, a third active path from I2-T1, from host H2 to data storage system 102, and a fourth active path from I2-T2, from host H2 to data storage system 104.

PR register or registration commands may be issued from the hosts H1 and H2 to data storage system 102. As part of discovery processing on H1, I1 issues a PR registration command 452 to register key K1 for LUN A over the path I1 to T1 from host H1 to data storage system 102. As part of discovery processing on H2, I2 issues a PR registration command 454 to register key K2 for LUN A over the path I2 to T1 from host H2 to data storage system 102. As a result of issuing the foregoing registration commands 452 and 454, information from the registration commands is stored in the registration database 410. The registration database 410 may include a table of information with a row for each of the registrations received. Each row of information corresponding to a registration may identify the LUN, the key (e.g., Reservation Key), initiator ID (identifier), target port ID and FA for that particular registrations. For example, 460*a* may represent information stored in the registration database 410 for the registration 452, and 460*b* may represent information stored in the registration database 410 for the registration 454.

Additionally, PR register or registration commands may be issued from the hosts H1 and H2 to data storage system 104. As part of discovery processing on H1, I1 issues a PR registration command 456 to register key K1 for LUN A over the path I1 to T2 from host H1 to data storage system 104. As part of discovery processing on H2, I2 issues a PR registration command 458 to register key K2 for LUN A over the path I2 to T2 from host H2 to data storage system 104. As a result of issuing the foregoing registration commands 456 and 458, information from the registration commands is stored in the registration database 420. In a manner similar to that as described for registration database 410, the registration database 420 may include a table of information with a row for each of the registrations received. Each row of information corresponding to a registration may identify the LUN, the key (e.g., Reservation Key), initiator ID (identifier), target port ID and FA for that particular registrations. For example, 460c may represent information stored in the registration database 420 for the registration 456, and 460b may represent information stored in the registration database 420 for the registration 458.

It should be noted that the identifiers or IDs, such as for the initiator, target port ID and FA may be, for example, unique world wide name (WWN) IDs.

Thus, in such an embodiment as illustrated in FIG. 7, the PR registration information is not automatically propagated or replicated between the two data storage systems 102 and 104. As described above, the hosts may issue a PR registration command over each path for each LUN.

As an alternative or variation to that described above, it should be noted that in an embodiment with a host cluster, each of the multiple hosts of the cluster may register with respect to the same LUN using the same key over multiple paths. In such an embodiment, for example, all registration commands 452, 454, 456 and 458 may be performed with respect to LUN A by both I1 and I2 using the same key, such as K1. In this case, rows 460a-d would all reference the same key K1.

Figure 8:
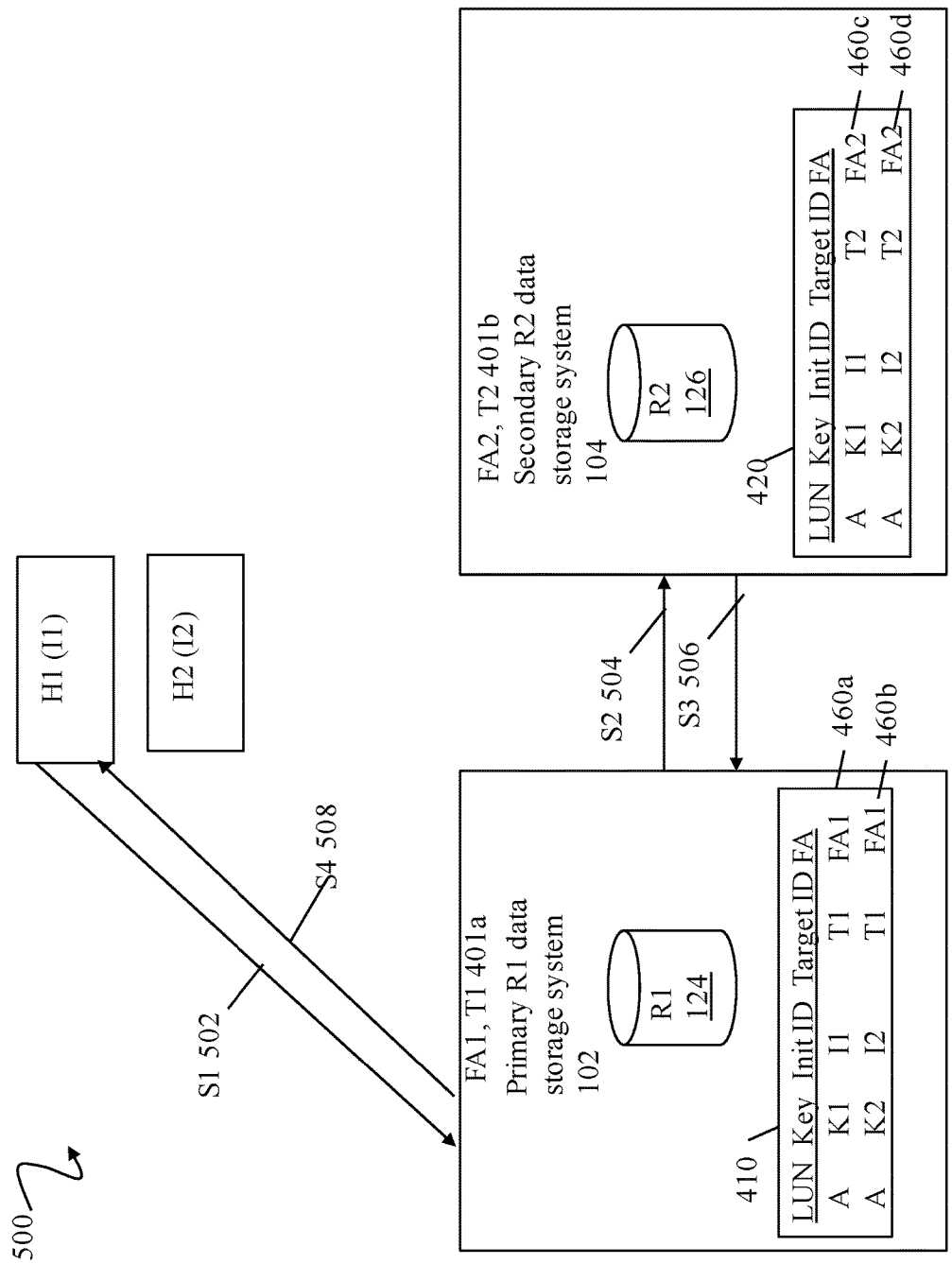

An embodiment in accordance with techniques herein may provide support for the PR IN command to read registration and reservation information from the databases 410, 420 as will be described in connection with reference to FIG. 8. The example 500 illustrates processing that may be performed to service the PR IN or read command in an active-active configuration such as described above in connection with FIG. 7 having 4 active paths and having databases 410 and 420 with information as previously illustrated in connection with FIG. 7. In other words, FIG. 8 illustrates processing performed for the PR IN command subsequent to issuing the 4 PR registration commands of FIG. 7.

It should be noted that an embodiment may include different command parameters with the PR_IN command to request and vary the particular information provided and returned to the requesting initiator. For example, a PR IN command may include one or more parameters identifying the particular information to be returned. For example, the PR IN command may include one or more parameters requesting to return a complete set of all registration and reservation information of the databases, return only reservation information, return only registration (e.g., key information), return only registration and/or reservation information associated with a particular key, and the like.

In this example, assume host H1 issues the PR IN command requesting a list of all existing or active registrations and reservations with respect to a particular LUN, such as LUN A. Generally, the PR IN command is directed to a particular LUN and issued over one of the paths (from initiator to a target port) for which there is an existing registration for the LUN.

I1 may issue in step S1 the PR IN command 502 with respect to LUN A to target port T1 of data storage system 102. The data storage system 102 may receive the command PR IN command and determine whether LUN A has an associated active-active RDF configuration with an R1 device or primary copy on a first data storage system 102 and a second R2 copy on a second data storage system, such as 104. If LUN A is determined to not be in an active-active RDF configuration, then processing may simply query the database 410 for the requested information and return the information requested in step S4 508. If LUN A is determined to be in an active-active RDF configuration as illustrated in the example 500, the data storage system 102 issues a request in step S2 504 over the RDF link between systems 102 and 104. The request in S2 504 may request the information from the registration database 420 of system 104 regarding LUN A to service the PR IN command received in step S1 502. In response to receiving the command in step S2 504, the data storage system 104 may read from its database 420 the requested information regarding LUN A and return the requested information from 420 in step S3 506 to the data storage system 102 over the RDF link. In this example, the information obtained from 420 and returned from system 104 to 102 in step S3 may include the information in rows 460ac and 460d regarding existing or active registrations for LUN A. It should be noted that if there were also existing reservations (described elsewhere herein) in the database 420 with respect to LUN A, then information regarding such reservations would also be returned in step S3 from the system 104 to the system 102.

The system 102 receives the returned registration and reservation information requested regarding existing registrations and reservations in database 420. The system 102 may then retrieve requested information from its own database 410, and may then perform processing to formulate a response message to be returned to I1 of H1 in step S4 508. The returned message may include a combination of the registration and reservation information requested from both databases 410 and 420 regarding LUN A. For example, the response returned in S4 508 may include a combination of registration information from 460a-460d denoting the 2 registrations 460a-b from database 410 regarding LUN A and also the 2 registrations 460c-d from database 420 regarding LUN A.

In this manner, the requesting host H1 or initiator I1 may be presented with a complete view of registration and reservation information with respect to all 4 paths to LUN A by issuing the PR IN command directed to LUN A over 1 of the 4 active paths to LUN A and behave as if the 4 active paths to LUN A are all on the same data storage system. This is consistent with discussion elsewhere herein whereby H1 and I1 have a view that paths I1-T1 and I1-T2 are two active paths to the same LUN A and H2 and I2 have view that paths I2-T1 and I2-T2 are two active paths to the same LUN A even though there are both primary and secondary copies 124,126 of LUN A configured in the active-active configuration on the two different data storage systems 102, 104.

Commands affecting or related to registrations and reservations, such as various ones of the PR commands, affect the ability of initiators and thus hosts to perform I/O with respect to different LUNs. For example, in connection with registrations, if there is no registration with respect to a particular I-T nexus (e.g., initiator and target port for a particular LUN), that initiator may at most be able to have read-only access to data of that LUN over the path from the initiator to the target port. As described below in more detail, an initiator may also issue other commands, such as a reservation command, which request a particular type of LUN access and may block or modify access allowed by other initiators and hosts.

Figure 9:
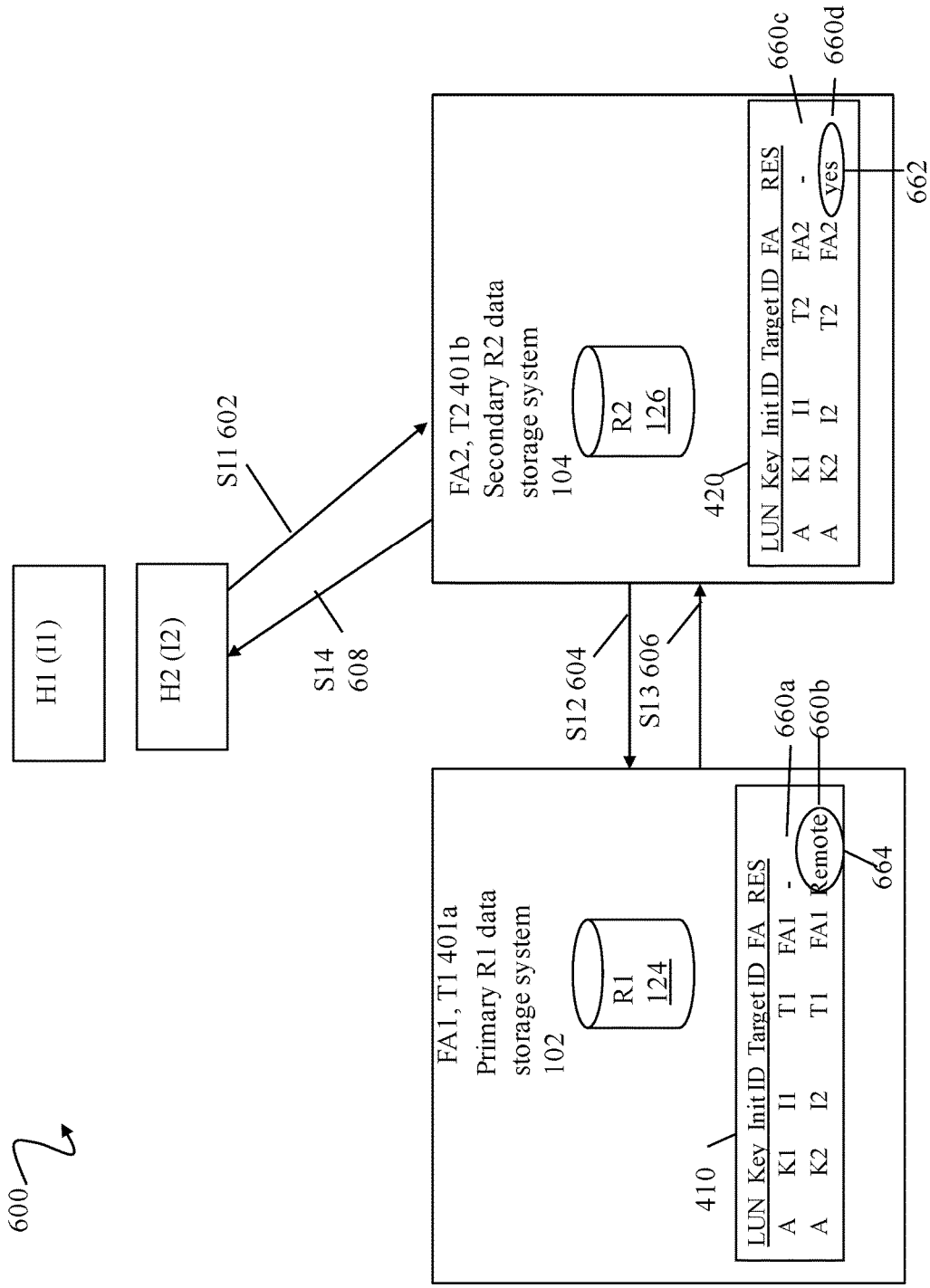

What will now be described is processing performed in an embodiment herein in an active-active configuration for the PR reserve or reservation command with reference to FIG. 9. The example 600 of FIG. 9 illustrates processing that may be performed to service the PR reserve command in an active-active configuration such as described above in connection with FIG. 7 with 4 active paths and having databases 410 and 420 with information as previously illustrated in connection with FIG. 7. FIG. 9 illustrates processing performed for the PR reserve command subsequent to issuing the 4 PR registration commands of FIG. 7.

A PR reserve or reservation command is issued over a path from a particular initiator to a particular target port and directed to a LUN (e.g. PR reservation may be made with respect to a particular LUN, initiator and target port). Additionally, the PR reserve or reservation command may include parameters such as a parameter that denotes a key of a previous PR registration and a parameter identifying an associated type of I/O access for the requested reservation. For example, the I/O access may be one of variety of different types of I/O access such as exclusive access (whereby no other initiator besides the current reservation holder having the exclusive access is allowed to issue any I/Os to the LUN), write exclusive access (whereby only the initiator holding the current reservation is allowed to issue writes but other initiators may issue read I/Os), and the like.

Referring to FIG. 10, shown is a table 700 of different types of I/O access that may be specified in a PR Reserve or reservation command in an embodiment in accordance with techniques herein. The table 70 includes 6 types of I/O access—one type per row—that may be specified in a PR reserve or reservation command in at least one embodiment in accordance with techniques herein.

Row 702 identifies access type of write exclusive which only allows write commands to be issued by the current persistent reservation holder. The current persistent reservation holder in this case is the single initiator identified in the reservation. Row 704 identifies access type of exclusive access which only allows access to the current persistent reservation holder which is the single initiator identified in the reservation (exclusive access where I/O commands are allowed only for the single initiator of the reservation). Row 706 identifies access type of write exclusive—registrants only, where write commands are allowed only for registered I_T nexuses (e.g., initiators having existing registrations with respect to the LUN in the reservation request). Row 708 identifies access type of exclusive access—registrants only, where I/O commands are allowed only for registered I_T nexuses (e.g., initiators having existing registrations with respect to the LUN in the reservation request). Row 710 identifies access type of exclusive access—registrants only, where I/O commands are allowed only for registered I_T nexuses (e.g., initiators having existing registrations with respect to the LUN in the reservation request). Row 711 identifies access type of exclusive access—all registrants, where I/O commands are allowed only for registered I_T nexuses (e.g., initiators having existing registrations with respect to the LUN in the reservation request). However, in connection with 712, each registered I_T nexus is a persistent reservation holder. It should be noted that for 706, the read commands are processed from both registered and unregistered initiators and additionally, only for the write commands are the registered initiators considered persistent reservation holders.

As described above in connection with FIG. 7, multiple PR registration commands may be issued over all multiple paths over with a particular LUN is accessible to a particular initiator (e.g., creating multiple registrations for the same initiator and same LUN but with a different target port for each registration for the same initiator and LUN combination). For example, initiator I2 of host H2 may issue 2 PR register commands as described in FIG. 7 to register LUN A over 2 active paths for I2 (e.g., see entries 460b and 460d with registrations for I2). As described in more detail below, processing may be performed to apply the reservation for LUN A received on one path to all paths having the same key. Thus, for example, where the same host has previously registered on multiple paths to LUN A, processing may be performed in an embodiment in accordance with techniques herein which mirror or replication the reservation for the LUN A across all paths to LUN A registered using the same key on both local and remote data storage systems.

Now, with reference to FIG. 9, initiator I2 may issue a single PR reservation command over a single path to LUN A and, in accordance with techniques herein, the reservation for LUN A with respect to I2 may be made current or active on all multiple paths registered for I2. More generally, the reservation state from data storage system 104 may be mirrored on both the local data storage system 104 and the remote data storage system 102.

For example, in a first step S11 602, initiator I2 may issue a PR reservation command to LUN A over the path from I2 to T2 of the data storage system 104. For purposes of illustration in this example, assume the PR reserve command includes key 2 and also includes an I/O access type of write exclusive as in entry 702 of FIG. 10 whereby I2 is requesting exclusive write access to LUN A where other initiators may perform non-write I/O (read) commands to LUN A but writes from other initiators are not allowed.

In response to receiving the reservation command in S11, the data storage system 104 may perform processing to determine whether there exists in database 420 a current matching registration with respect to the key K2 for path I2-T2 for the particular LUN A, and additionally whether there is an existing conflicting reservation with respect to LUN A in the database 420. If there is no such current matching registration or there is an existing reservation for LUN A in database 420, an error condition or status may be returned in step S14 608 to the requesting initiator I2 and the PR reservation is not performed.

If there is such a current matching registration in 420 and there are also no existing reservations in the database 420, processing proceeds to identify the entry in the database 420 having the current matching registration. In this example, entry 660d of database 420 is identified as the current matching registration including key K2, along with an initiator ID=I2, target ID=T2 and LUN=LUN A (I_T nexus) matching that of the PR Reserve command in S11 602. As denoted by the "yes" 662, entry 660d is updated to reflect the PR reservation. Although not illustrated for simplicity, the database 420 may also be updated to reflect the I/O access type specified in the PR reserve command received in S11 602. Processing the continues with step S12 604 where system 104 issues a request to the data storage system 102 over the RDF link between systems 102 and 104 to mirror on system 102 the PR reservation as indicated in the PR reserve command received in step S11. The request sent in step S12 may include key K2 and may also include information regarding the reservation request (e.g., LUN A, the request type of I/O access).

In response to receiving the request issued in step S12 604 from system 104 to system 102, system 102 performs processing. The processing may include confirming that database 410 has no existing reservation for LUN A and also that there exists a current matching registration for LUN A with key K2. Additionally, an embodiment may also optionally match additional information such as require that the matching registration also denote initiator I2. In this example, there are no existing reservations for LUN A in database 410 and additionally entry 660b may be identified as matching in that it has matching key K2 registered for LUN A. Thus, processing may be performed to update database 410 to also reflect the requested reservation by updating matching registration entry 660b. In the example 600, matching entry 660b is identified and marked 664 as being a "remote" reservation mirroring a reservation on data storage system 104. Although not illustrated for simplicity, the database 410 may also be updated to reflect the I/O access type specified in the PR reserve command received in S11 602. The system 102 returns a status or response message in S13 606 to the system 104 over the RDF link indicating the status of the prior request of step S12 604 to mirror the PR reservation in the database 410 on system 104. If the status message received in S13 by system 104 indicates that system 102 successfully mirrored the PR reservation (as requested in step S12 604), then the system 102 returns a similar success response or status to the initiator I2 in step S14 608. Otherwise, if the status message received in S13 by system 104 indicates that system 102 failed to successfully mirror the PR reservation (as requested in step S12 604), then the system 102 removes the reservation 662 from entry 660d and returns an error response or status to the initiator I2 in step S14 608 indicating that the requested reservation failed.

Thus, in this manner, reservations from local data storage system 104 (receiving the PR reservation command) may be mirrored on remote data storage system 102 in an atomic manner. In particular, receiving a reservation on a first path for LUN A results in mirroring the reservation, for example, such as across all multiple paths over which LUN A is accessible where such paths are also each registered using the same key. In this example, receiving a reservation on one path over which LUN A is accessible through a first data storage system results in replicating the reservation state across a second path over which LUN A is accessible through a second data storage system.

If for some reason the mirroring of the reservation from system 104 to system 102 is unsuccessful, the PR reservation command received may be rejected by the system 104 and any updating to database 420 performed on the local system 104 may be undone to revert or restore the database 420 to its state prior to the PR reservation command just processed.

It should be noted that the foregoing example of FIG. 9 resulted in updating entry 660b of database 410 and 660d of database 420 based on the particular information (e.g., particular key, LUN A, path over which the command is issued, type of I/O access for the reservation). However, different entries of the databases 410, 420 may be updated in connection with particular information specified on other PR reservation commands. For example, specifying I/O access of 710 "write exclusive—all registrants" may result in indicating reservations for multiple entries in the database 410 and multiple entries in the database 420.

Figure 11:
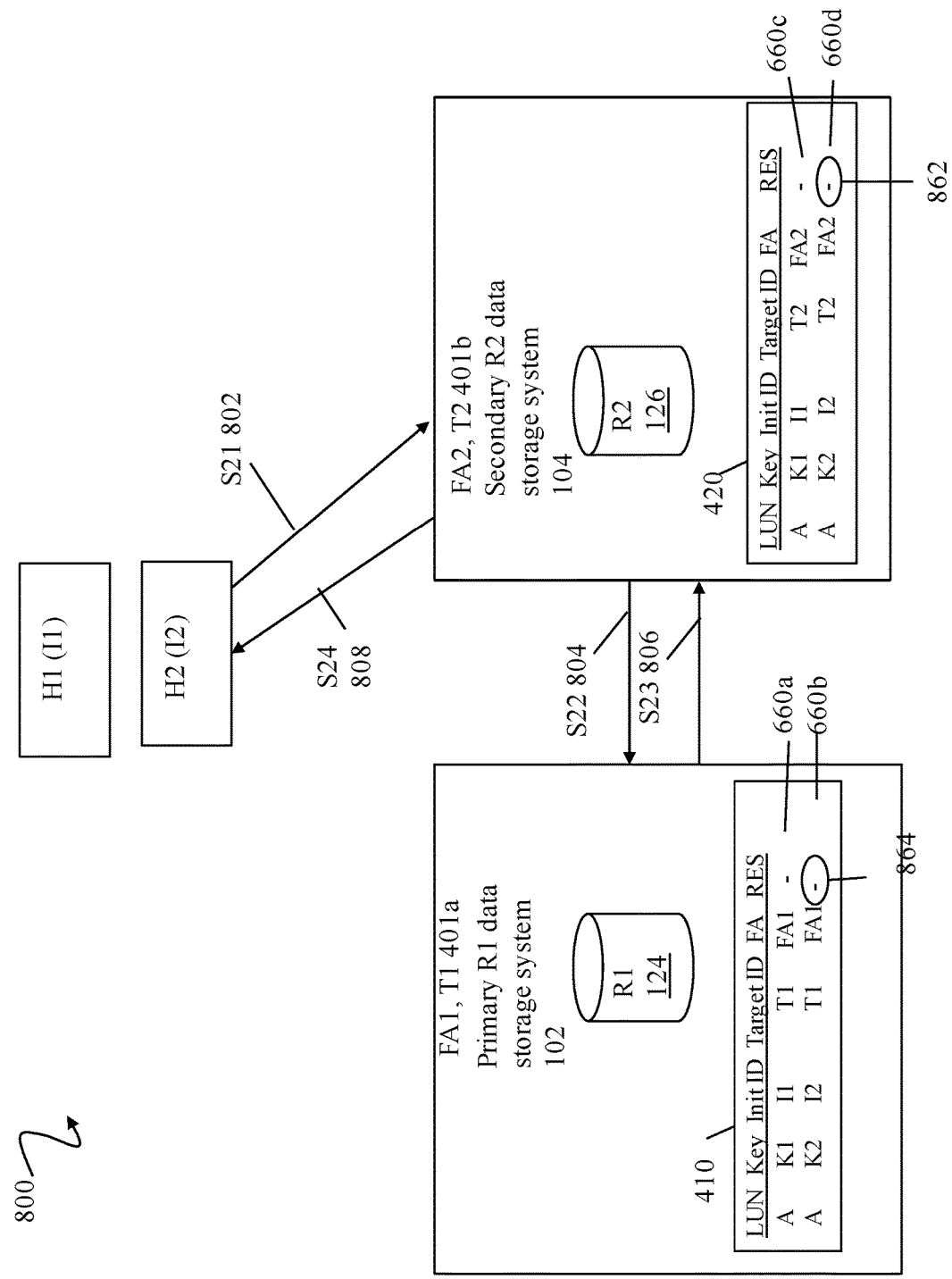

What will now be described is processing performed in an embodiment herein in an active-active configuration for the PR clear command with reference to FIG. 11. The example 800 of FIG. 11 illustrates processing that may be performed to service the PR clear command in an active-active configuration such as described above in connection with FIG. 9 with 4 active paths and having databases 410 and 420 with information as previously illustrated in connection with FIG. 9. FIG. 11 illustrates processing performed for the clear command after having issued the 4 PR registration commands of FIG. 7 and the PR reserve command of FIG. 9.

Generally, the clear command may clear the registration database of active reservations and registrations for a particular LUN. In the example 800 of FIG. 11, changes made with respect to the local data storage system receiving the clear command are mirrored on the remote data storage system. In connection with the SCSI-3 standard, clear is a sub-command of the PROUT command and is issued to a particular LUN to release or clear the persistent reservation (if any) and clear registrations for the LUN. In one embodiment, a reservation key may be included in the clear command issued to the LUN where the command is sent from an initiator to a target, and the supplied reservation key is registered for the combination of the initiator, target and LUN.

In a first step S21 802, initiator I2 may issue a PR clear command to LUN A over the path from I2 to T2 of the data storage system 104. For purposes of illustration in this example, assume the PR clear command includes key K2. In response to receiving the clear command in S21, the data storage system 104 may perform processing to determine whether there exists in database 420 a current registration with respect to the key K2 for path I2-T2 for the particular LUN A in the database 420. If there is no such current registration for LUN A in database 420, an error condition or status may be returned in step S24 808 to the requesting initiator I2 and the PR clear is not performed.

If there is such a current registration in database 420, processing proceeds to remove any existing persistent reservation for LUN A and also clear any existing registrations for LUN A in the database 420. In this example, entry 660d is identified as the current registration including key K2, along with an initiator ID=I2, target ID=T2 and LUN=LUN A (I_T nexus) matching that of the PR clear command received in S21 802. Processing performed for the clear command includes removing the reservation 662 as in FIG. 9 to be as no or null as illustrated by 862 of entry 660d. Additionally, entries 660c-d denoting 2 registrations for LUN A are removed from the database 420.

Processing then continues with step S22 804 where system 104 issues a request to the data storage system 102 over the RDF link between systems 102 and 104 to mirror on system 102 the PR clear command received in step S21. In response to receiving the request issued in step S22 804 from system 104 to system 102, system 102 performs processing. The processing may include clearing any persistent reservation for LUN A in the database 410 and also removing any/all existing registrations for LUN A from the database 410. In this example, the "remote" reservation 664 as in FIG. 9 is removed, as denoted by the updated status of 864 denoting a null or no reservation status. Additionally, entries 660a-b denoting 2 registrations for LUN A are removed from the database 410.

The system 102 returns a status or response message in S23 806 to the system 104 over the RDF link indicating the status of the prior request of step S22 604 to mirror the PR clear command clearing persistent reservations and registrations for LUN A from the database 410 on system 104. If the status message received in S23 by system 104 indicates that system 102 successfully mirrored the PR clear command (as requested in step S22 804), then the system 102 returns a similar success response or status to the initiator I2 in step S24 808. Otherwise, if the status message received in S23 by system 104 indicates that system 102 failed to successfully mirror the PR clear command (as requested in step S22 804), then the system 102 may restore or revert the database 420 back to its state prior to performing processing for the clear command (e.g., reinstate any registrations and reservations previously removed). Additionally, a response is returned to initiator I2 in step S24 808 indicating that the requested clear command has failed. In this example, the PR clear command has been successfully mirrored on data storage system 102 resulting in a success status being returned in steps S23 806 and also S24 808.

Thus, any reservations and registrations cleared on the local data storage system 104 (receiving the PR clear command) may be mirrored on remote data storage system 102 in an atomic manner. If for some reason the clear command fails on system 104 or the mirroring of the clear command on system 102 is unsuccessful, the PR clear command received may be rejected by the system 104. Any updating to database 420 performed on the local system 104 may be undone to revert or restore the database 420 to its state prior to the PR clear command just processed. As described above, the clear command directed to a particular LUN, such as LUN A, may result in clearing all reservations and registrations for the LUN from both databases 410 and 420.

As a variation to that described above in connection with the clear command, an embodiment may also include one or more parameters of the clear command which provide different scoping variations to which the clear command is applied for LUN A. For example, rather than clear all reservations and registrations for LUN A, parameters of the command may be specified which vary the scope so that, for example, the reservations and registrations of databases 410, 420 cleared each are specified for LUN A and also have an associated key matching a particular key such as K2. In this case, the reservations 662, 664 of FIG. 9 are removed as respectively denoted by resulting modification of 862, 864 of FIG. 11. Additionally, entry 660d of database 420 and entry 660b of database 410 may be removed since entries 660b, 660d each have a key=K2 matching the key value provided with the clear command in step S11 602. An embodiment may additionally specify other criteria affecting which reservations and/or registrations are cleared from databases 410, 420. For example, additional criteria may also include specifying a particular type of I/O access that must be matched against an existing reservation for the reservation to be cleared by the clear command, specifying a particular initiator and/or target port that must be matched against an existing reservation in order for the existing reservation to be released or cleared, and specifying a particular initiator and/or target port that must be matched against an existing registration in order for the existing registration to be cleared.

What will now be described is processing performed in an embodiment herein in an active-active configuration for the PR release command with reference again to FIG. 11. It is noted that although FIG. 11 processing flow and databases 410 and 420 are described above with respect to the PR clear command, the same figure is again being used to describe processing in connection with the PR release command.

The example 800 of FIG. 11 illustrates processing that may be performed to service the PR release command in an active-active configuration such as described above in connection with FIG. 9 with 4 active paths and having databases 410 and 420 with information as previously illustrated in connection with FIG. 9. FIG. 11 illustrates processing performed for the release command after having issued the 4 PR registration commands of FIG. 7 and the PR reserve command of FIG. 9.

Generally, the release command releases any active persistent reservation but does not remove the registrations for a particular LUN. In the example 800 of FIG. 11, changes made with respect to the local data storage system receiving the release command are mirrored on the remote data storage system. In connection with the SCSI-3 standard, the release is a sub-command of the PROUT command and is issued to a particular LUN to release or clear the persistent reservation (if any) from the LUN. The release command is issued from an initiator to a target, and the command may include a reservation key and type of I/O access which needs to be matched against an existing reservation (e.g., for the particular combination of the LUN, the initiator sending the release command, and the target receiving the release command). Thus, the release command releasing a reservation for a particular LUN must be issued over the same initiator-target path as the previous reservation it is releasing.

In a first step S21 802, initiator I2 may issue a PR release command to LUN A over the path from I2 to T2 of the data storage system 104. For purposes of illustration in this example, assume the PR release command includes key K2 with a first type of I/O access (e.g. one of the types from the table of FIG. 10). In response to receiving the release command in S21, the data storage system 104 may perform processing to determine whether there exists in database 420 a current reservation and an associated registration matching key K2, the first type of I/O access, and the path I2-T2 for the particular LUN A. If there is no such matching current reservation and associated registration for LUN A in database 420, an error condition or status may be returned in step S24 808 to the requesting initiator I2 and the PR release is not performed.

If there is such a matching current reservation and associated registration in database 420, processing proceeds to remove the existing matching persistent reservation for LUN A from the database 420. With reference back to FIG. 9, illustrated is the database 420 prior to performing any updates due to the release command. In FIG. 9, reservation 662 and associated registration 660d are identified as matching the specified criteria of the release command of key K2, the first type of I/O access, and the path I2-T2 for the particular LUN A.

Processing performed to the database 420 for the release command in this example may include removing reservation 662 of FIG. 9 as denoted by 862 of FIG. 11 representing the resulting null or no reservation status in entry 660d for LUN A.

Processing then continues with step S22 804 where system 104 issues a request to the data storage system 102 over the RDF link between systems 102 and 104 to mirror on system 102 the PR release command received in step S21. The request sent from system 104 to system 102 in step S22 may include key K2 along with other information for the release command, such as the initiator I2 and the type of I/O access. In response to receiving the request issued in step S22 804 from system 104 to system 102, system 102 performs processing. The processing may include releasing any remote persistent reservation for LUN A in the database 410 for initiator I2 having key K2 and also the same first type of I/O access from the database 410. In this example, with reference back to FIG. 9, entry 660b is identified as having the matching remote reservation 664 of FIG. 9 which is released/modified as denoted by 864 of FIG. 11 representing the resulting null or no remote reservation status in entry 660b of FIG. 11.

The system 102 returns a status or response message in S23 806 to the system 104 over the RDF link indicating the status of the prior request of step S22 804 to mirror the PR release command releasing any remote persistent reservation for LUN A for I2 from the database 410 on system 104. If the status message received in S23 by system 104 indicates that system 102 successfully mirrored the PR release command (as requested in step S22 804), then the system 102 returns a similar success response or status to the initiator I2 in step S24 808. Otherwise, if the status message received in S23 by system 104 indicates that system 102 failed to successfully mirror the PR release command (as requested in step S22 804), then the system 102 may restore or revert the database 420 back to its state prior to performing processing for the release command (e.g., reinstate the persistent reservation 660d previously removed). Additionally, a response is returned to initiator I2 in step S24 808 indicating that the requested command has failed.

In this example, the PR release command has been successfully mirrored on data storage system 102 resulting in a success status being returned in steps S23 806 and also S24 808.

Thus, the reservation released on the local data storage system 104 (receiving the PR release command) may be mirrored on remote data storage system 102 in an atomic manner. If for some reason the clear command fails on system 104 or the mirroring of the release command on system 102 is unsuccessful, the PR release command received may be rejected by the system 104. Any updating to database 420 performed on the local system 104 may be undone to revert or restore the database 420 to its state prior to the PR release command just processed.

As described above, the release command directed to a particular LUN, such as LUN A, may result in clearing existing reservations for the LUN A from both databases 410 and 420 where each such reservation has a type of I/O access matching that of the release command, and additionally where each such reservation is associated with a registration having a key=K2 and initiator I2 matching those of the release command.

As a variation to that described above in connection with the release command, an embodiment may also provide different scoping variations to which the release command is applied for LUN A. Parameters of the release command may be specified which vary the scope so that, for example, the reservations of the databases 410, 420 released each have an associated key matching a particular key such as K2 without regard to other specified matching criteria such as type of I/O access and initiator I2. As another example the scope may be varied so that the reservations of databases 410, 420 released each have an associated key matching a particular key such as K2 and also having a matching type of I/O access without regard to other specified matching criteria such initiator I2.

Figure 12:
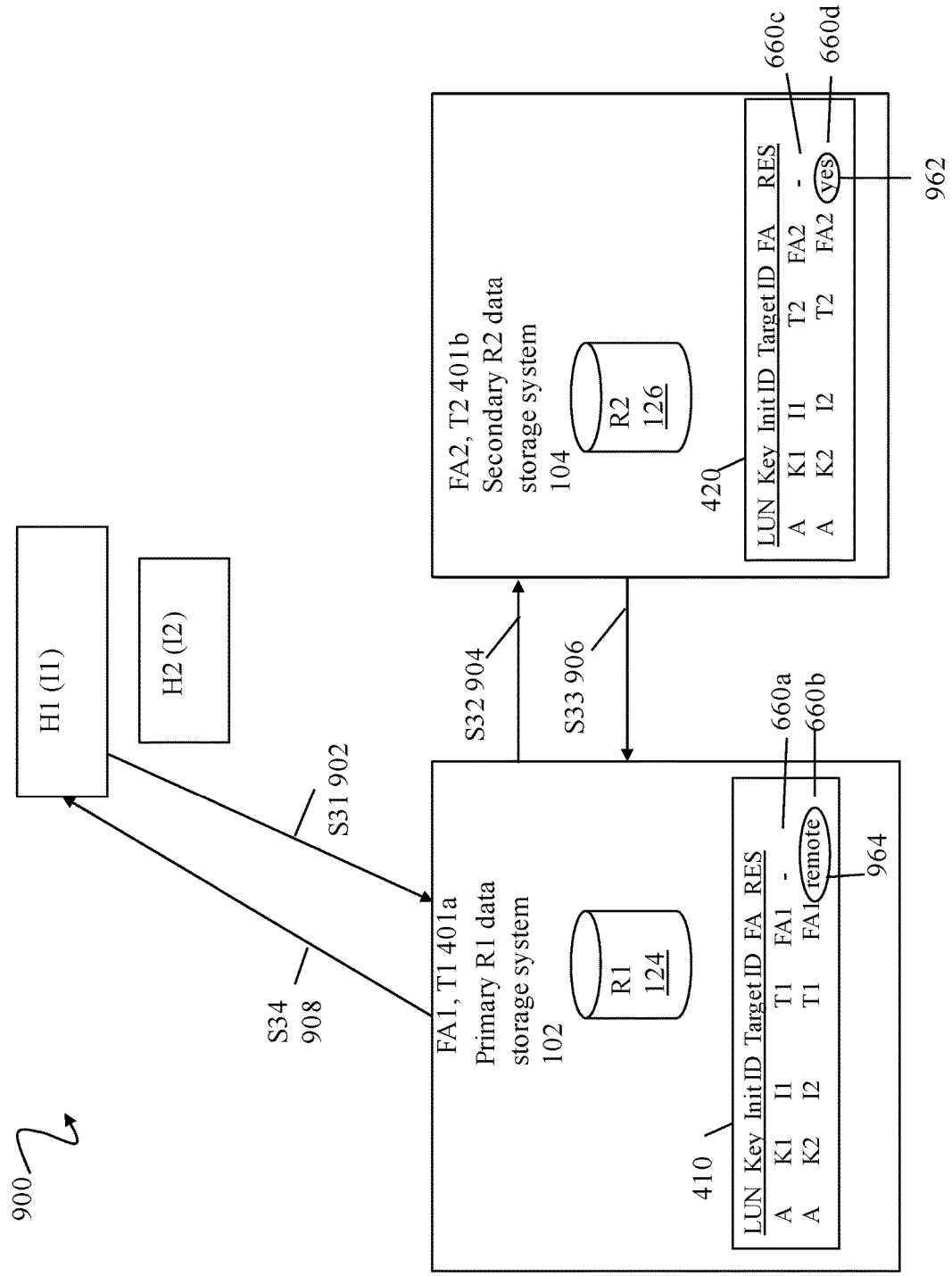

What will now be described is processing performed in an embodiment herein in an active-active configuration for the preempt command with reference to FIG. 12. The example 900 of FIG. 12 illustrates processing that may be performed to service the preempt command in an active-active configuration such as described above in connection with FIG. 9 with 4 active paths and having databases 410 and 420 with information as previously illustrated in connection with FIG. 9. FIG. 12 illustrates processing performed for the preempt command after having issued the 4 registration commands of FIG. 7 and the reserve command of FIG. 9 (reservations for I2).

Generally, the preempt command may be performed by a first initiator to preempt another second initiator's access and use of a LUN whereby the first initiator releases an existing or current reservation for the LUN of the second initiator. Subsequent to successful completion of the release command releasing the second initiator's reservation for the LUN, the first initiator may then proceed with issuing a reservation command to reserve the LUN for its own use and access (e.g., such as by issuing a reserve/reservation command, as described elsewhere herein, to create a reservation for the first initiator). In the example 900 of FIG. 12, changes made with respect to the local data storage system receiving the preempt command are mirrored on the remote data storage system. In connection with the SCSI-3 standard, for example, preempt is a sub-command of the PROUT command that preempts an existing persistent reservation matching a specified registration key as included in the preempt command. Thus, the preempt command is issued from an initiator to a target and directed to a LUN, where the command includes a reservation key. The preempt command is used to preempt an existing reservation for the LUN having a reservation key matching that of the preempt command.

In connection with the example 900, there are existing registrations 962 and 964 for LUN A with respect to initiator I2 of host H2. Initiator I1 of host H1 may use the preempt command to preempt and therefore release such current reservations of I2. In a first step S21 902, initiator I1 may issue a preempt command to LUN A over the path from I1 to T1 of the data storage system 102. For purposes of illustration in this example, assume the preempt command includes key K2 and is directed to LUN A. In response to receiving the preempt command in S31, the data storage system 102 may perform processing to determine whether there exists in database 410 a current reservation associated with a registration having a key that matches the key K2 for the particular LUN A. If there is such a current reservation in database 410, processing proceeds to release the existing matching persistent reservation for LUN A from the database 410. In this example, reservation 964 of associated registration 660b is identified as the current matching reservation and associated registration including matching key K2 for LUN A. Processing performed for the preempt command in this example may include releasing reservation 964 of FIG. 12.

Processing then continues with step S32 904 where system 102 issues a request to the data storage system 104 over the RDF link between the foregoing systems 102 and 104 to mirror on system 104 the preempt command received in step S31. The preempt request sent from system 102 to system 104 may include the key K2. In response to receiving the request issued in step S32 904 from system 102 to system 104, system 104 performs processing. The processing may include releasing any remote persistent reservation for LUN A in the database 420 having an associated registrations with a key matching K2. In this example, reservation 962 of entry 660d having a matching key=K2 is released.

The system 104 returns a status or response message in S33 906 to the system 102 over the RDF link indicating the status of the prior request of step S32 904 to mirror the preempt command clearing any remote persistent reservation for LUN A having key K2 from the database 420 on system 104. If the status message received in S33 by system 102 indicates that system 104 successfully mirrored the preempt command (as requested in step S32 904), then the system 102 returns a similar success response or status to the initiator I2 in step S34 908. Otherwise, if the status message received in S33 by system 102 indicates that system 104 failed to successfully mirror the preempt command (as requested in step S32 904), then the system 102 may restore or revert the database 410 back to its state prior to performing processing for the preempt command (e.g., reinstate the persistent reservation 964 previously removed). Additionally, a response is returned to initiator I1 in step S34 908 indicating that the requested command has failed. In this example, the preempt command has been successfully mirrored on data storage system 104 resulting in a success status being returned in steps S33 906 and also S34 908.

Thus, in this manner, the reservation released through preemption on the local data storage system 102 (receiving the preempt command) may be mirrored on remote data storage system 104 in an atomic manner. If for some reason the command fails on system 102 or the mirroring of the preempt command on system 104 is unsuccessful, the preempt command received may be rejected by the system 102. Any updating to database 410 performed on the local system 102 may be undone to revert or restore the database 410 to its state prior to the preempt command just processed.

As a variation to that described above in connection with the preempt command, an embodiment may also provide different scoping variations to which the preempt command is applied for LUN A. As described above, the reservations of the databases 410, 420 preempted for LUN A each have an associated key matching a particular key such as K2 without regard to other matching criteria such as type of I/O access. As a variation, parameters of the preempt command may be specified which vary the scope so that, for example, the reservations of the databases 410, 420 for LUN A preempted each have an associated key matching a particular key such as K2 and may also additionally match one or more other matching criteria such as any one or more of a specified type of I/O access, a specified initiator and a specified target port.

It should be noted that in connection with the foregoing commands, as described above, one or more of the commands, such as registration or register commands, may be performed as part of discovery processing such as, for example, when the hosts are initially booting or coming online. The commands described herein may also be performed at other times in connection with other tasks as may be needed to acquire a desired access to a LUN (e.g., write access or exclusive access) or otherwise block or modify access of another system, initiator, and the like, to a LUN (e.g., such as by issuing commands that create a new reservation, clear an existing reservation and/or registration, release an existing reservation, preempt an existing reservation).

Figure 13:
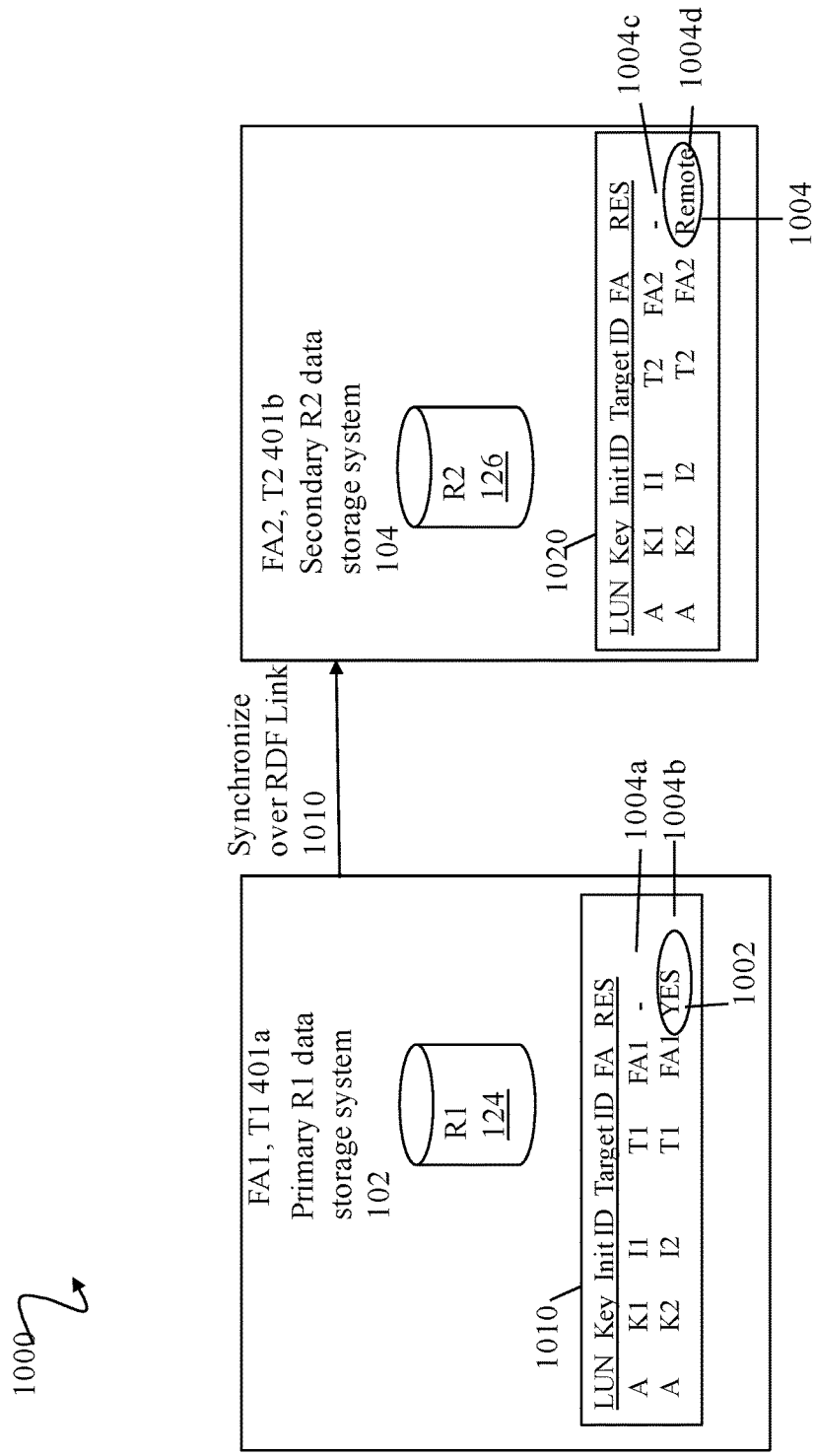

In at least one embodiment, there may be one or more existing registrations and/or reservations in an existing database prior to starting or initiating RDF on the data storage systems 102, 104. In this case, processing may be performed to synchronize the databases 410 and 420 so that both include the same reservations at startup. For example, referring to the example 1000 of FIG. 13, shown are data storage systems 102 and 104 with databases 1010, 1020 and described above. In this example, prior to starting RDF, the databases 1010 and 1020 includes registrations and reservations. As part of starting RDF, processing may be performed to synchronize reservations between the databases 1010 and 1020. In this example 1000, database 101 may include registration 1004b with an existing reservation 1002.

As part of starting RDF, processing may be performed to mirror the existing reservation 1002 in the database 1020 of remote data storage system 104 by propagating the reservations over the RDF link 1010. Consistent with discussion above, the reservation 1002 of database 1010 may be replicated to database 1020 by identifying an existing registration in database 1020 matching specified criteria as denoted by registration entry 1004b. For example, the specified criteria may include identifying a matching registration in database 1020 having a LUN, initiator, and key, respectively, matching the LUN A, initiator=I2, and key=K2 as denoted by registration entry 1004b. In this example, entry 1004d may be identified as matching such criteria and may be updated to include reservation 1004 mirroring the reservation 1002. As described above, the reservation mirroring denoted by 1004 may also include mirroring the particular type of I/O access specified for reservation 1002.

Figure 14:
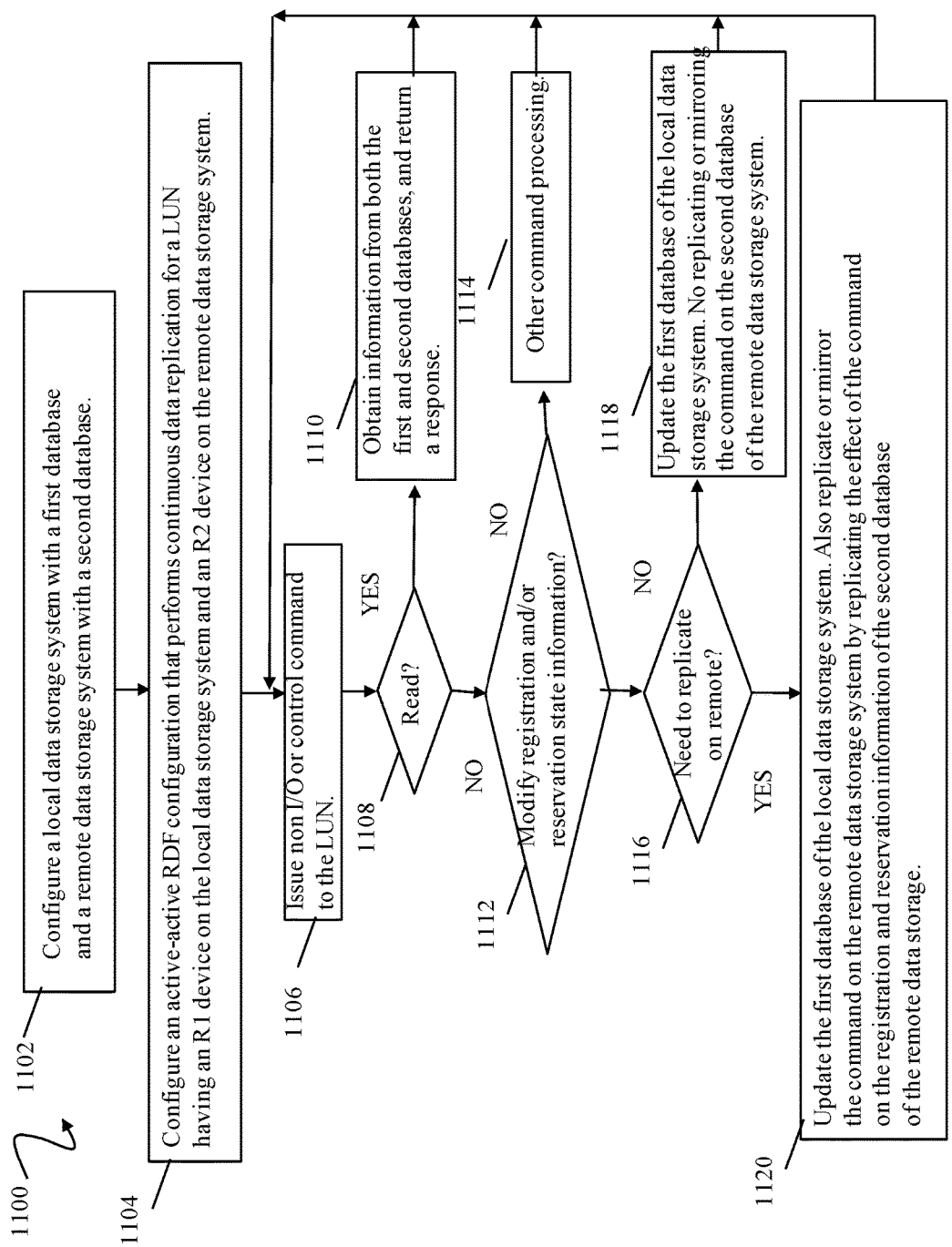
FIG. 14 is a flowchart of processing steps that may be performed in an embodiment in accordance with techniques herein.

Referring to FIG. 14, shown is a flowchart of processing steps that may be performed in an embodiment in accordance with techniques herein. The flowchart 1100 generally summarizes processing steps described above. At step 1102, a local data storage system may be configured with a first database and a remote data storage system may be configured with a second database. Both the first and second databases may be databases that store registration and reservation information with respect to LUNs or logical devices having storage provisioned on the data storage systems. At step 1104, an active-active RDF configuration is configured that performs continuous data replication for a LUN having an R1 device on the local data storage system and an R2 device on the remote data storage system. In the active-active RDF configuration, one or more hosts each having one or more initiators may issue I/O commands to the LUN over multiple paths to both the local and remote data storage systems. At step 1106, an initiator may issue a non I/O or control command to the LUN which may be received at the local data storage system. At step 1108, a determination is made as to whether the command received by the local data storage system is to read registration and reservation information from the first and second databases. If step 1108 evaluates to yes, control proceeds to step 1110 where processing is performed to obtain the registration and reservation information for the requested LUN from both the first and second databases and return a response to the requester where the response includes the requested information. Step 1108 evaluating to yes means the received command is the read command, such as the PR IN command described above. From step 1108, control proceeds to step 1106 to wait for the next non-I/O or control command directed to the LUN to be issued and received by the local data storage system.

If step 1108 evaluates to no, control proceeds to step 1112 where a determination is made as to whether the command issued in step 1106 modifies registration and/or reservation state information as stored in the first and second databases.

If step 1112 evaluates to yes, control proceeds to step 1116. If step 1112 evaluates to yes, the command may be any one of the non-I/O or control commands as described herein that modifies registration and reservation information. For example, the command may be any of a register command that establishes or creates a new registration for a particular initiator-target-LUN (I-T-L) combination, a register or registration command that creates a reservation, a preempt command that preempts a current existing reservation, a clear command that clears registration and/or reservation information, or a release command that releases a reservation as described herein.

At step 1116, a determination is made as to whether the command received at the local data storage system needs to be replicated or mirrored on the remote data storage system. If step 1116 evaluates to no, control proceeds to step 1118 where the first database of the local data storage system is updated per the command without replicating or mirroring the command on the second database of the remote data storage system. It should be noted that step 1116 evaluates to no if the command is the register or registration command as described herein. From step 1116, control proceeds to step 11106 to wait for the next command.

If step 1116 evaluates to yes, control proceeds to step 1120 where the first database of the local data storage system is updated per the command. Additionally, processing is performed to replicate or mirror the command on the remote data storage system by replicating the effect of the command on the registration and reservation information of the second data base of the remote data storage system. It should be noted that step 1116 evaluates to yes if the command is any of a register or registration command that creates a reservation, a preempt command that preempts a current existing reservation, a clear command that clears registration and/or reservation information, or a release command that releases a reservation as described herein. From step 1120, control proceeds to step 1106.

If step 1112 evaluates to no, control proceeds to step 1114 to perform other processing for the particular command received. It should be noted that step 1112 evaluating to no means that the command issued in step 1106 is not one of the non I/O or control commands that modifies the registration and reservation information as described herein. From step 1114, control proceeds to step 1106.

Described above are various examples illustrating techniques for maintaining and using registration and reservation information in an active-active configuration for remote data replications. Such techniques may be used in a clustered host environment as well as an environment including multiple hosts not configured in a cluster. As described above, techniques herein provide for automatically mirroring or replicating commands, and thus, registration and reservation state information as appropriate, between the two data storage systems of the active-active configuration. The foregoing provides a host with the view that there are multiple active paths (over which I/Os are allowed) to the logical device where the logical device is configured to have an R1 device on the first data storage system and an R2 device on the second data storage system. Additionally, the host is unaware of the fact that the multiple paths span multiple data storage system and the host also unaware of the dual maintained R1 and R2 copies of the logical device. Through selectively and automatically replicating/mirroring appropriate registration and reservation state between the two data storage systems, from the host's point of view, the foregoing provides the host with a view of a single logical device on a single "logical" data storage system where the host may issue I/Os over multiple paths to the single data storage system. Additionally, the foregoing provides for processing command requests, such as to read registration and reservation information, in a manner that consistently presents the single logical data storage system view to the host. As described above, such techniques provide for replicating or mirroring reservation state information between the systems. However, consistent with the foregoing host view of a single logical data storage system, commands that register individual paths to access the logical device are not mirrored or replicated between the two data storage systems. As also discussed above, the various commands that affect registration and reservation state information may be used to control access to the logical device (e.g., allowing a particular access to one or more hosts or initiators while also blocking a particular type of access of others to the device).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing commands comprising:
   receiving, from an initiator at a first data storage system, a first command over a first of a plurality of paths, the first command being directed to a logical device, wherein a first device of the first data storage system and a second device of a second data storage system are configured as a same logical device, the logical device, wherein the plurality of paths to the logical device includes the first path from the initiator to a first target port of the first data storage system and includes a second path to a second target port of the second data storage system, wherein both the first path and the second path are active paths at a same point in time over which I/Os are issued to the same logical device and wherein the first device and the second device are configured for automated data replication whereby writes to the logical device received at the first data storage system are written to the first device and automatically replicated to the second device and writes to the logical device received at the second data storage system are written to the second device and automatically replicated to the first device;
   determining whether the first command modifies any of registration and reservation state information and whether the first command is to be replicated on the second data storage system;
   responsive to determining that the first command modifies any of registration and reservation state information, performing first processing in accordance with the first command to update a first data container of the first data storage system, the first data container including registration and reservation information for the first data storage system; and
   responsive to determining that the first command is to be replicated on the second data storage system, performing second processing in accordance with the first command to update a second data container of the second data storage system, the second data container including registration and reservation information for the second data storage system.

2. The method of claim 1, wherein the first command requests creation of a registration for the logical device, the initiator and the first target port, said registration being associated with a first key of the first command.

3. The method of claim 2, wherein it is determined that the first command modifies registration information for the logical device and it is determined that the first command is not to be replicated on the second data storage system, and the method further includes:

performing said first processing including executing the first command on the first data storage system to update the first data container to indicate creation of the registration for the logical device and wherein the registration is associated with the first key, and wherein said second processing is not performed, the first command is not executed on the second data storage system, and the second data container on the second data storage system is not updated in accordance with the first command.

4. The method of claim 1, wherein the first command modifies reservation information for the logical device.

5. The method of claim 4, wherein it is determined that the first command modifies reservation information for the logical device and it is determined that the first command is to be replicated on the second data storage system, and the method further includes:
performing said first processing including executing the first command on the first data storage system to update reservation information of the first data container; and
performing said second processing including:
sending a request from the first data storage system to the second data storage system to execute the first command; and
executing the first command on the second data storage system to update reservation information of the second data container.

6. The method of claim 5, wherein the request is sent over a connection used for remote data replication by a remote data facility that automatically replicates changes of the first device to the second device, and automatically replicates changes of the second device to the first device.

7. The method of claim 6, wherein the first command is any of a command to create a reservation for the logical device, release a reservation for the logical device, preempt an existing reservation for the logical device, and clear reservation and registration information for the first device.

8. The method of claim 7, wherein the first command includes a first key, the first data container includes a first registration of the first path for the logical device, the second data container includes a second registration of the second path for the logical device, and each of the first registration and the second registration is associated with the first key.

9. The method of claim 8, wherein the command is to create a reservation for the logical device, and wherein said first processing includes:
determining whether there is a matching existing registration in the first data container matching one or more criteria including the first key; and
responsive to determining that the first registration is the matching existing registration, executing the first command on the first data storage system that updates reservation information in the first data container for the logical device to indicate a first reservation on the first path for the logical device, said first reservation being associated with the first key.

10. The method of claim 9, wherein the second processing includes:
determining whether there is a second matching existing registration in the second data container matching one or more criteria including the first key; and
responsive to determining that the second registration is the second matching existing registration, executing the first command on the second data storage system that updates reservation information in the second data container for the logical device to indicate a second reservation on the second path for the logical device, said second reservation being associated with the first key.

11. The method of claim 8, wherein the first command is any of a command to release a reservation for the logical device, preempt an existing reservation for the logical device, and clear reservation and registration information for the first device, and wherein said first processing includes:
determining whether there is a matching existing reservation in the first data container matching one or more criteria including the first key; and
responsive to determining that the first registration is the matching existing reservation, executing the first command on the first data storage system that updates reservation information in the first data container for the logical device to indicate the matching existing reservation is released.

12. The method of claim 11, wherein the second processing includes:
determining whether there is a second matching existing reservation in the second data container matching one or more criteria including the first key; and
responsive to determining that the second reservation is the second matching existing reservation, executing the first command on the second data storage system that updates reservation information in the second data container for the logical device to indicate the second matching existing reservation is released.

13. The method of claim 1, further comprising:
determining whether the first command is a command to read registration and reservation information for the logical device; and
responsive to determining the first command is a command to read registration and reservation information for the logical device, performing third processing comprising:
obtaining from the first data container first registration and reservation information for the logical device;
sending a request from the first data storage system to the second data storage system to return second registration and reservation information for the logical device;
receiving, at the first data storage system from the second data storage system, the second registration and reservation information for the logical device; and
returning a response to the initiator, said response including the first registration and reservation information and the second registration and reservation information.

14. The method of claim 1, wherein the initiator is included in a first host.

15. The method of claim 14, wherein the first host is a member of a cluster including the first host and one or more other hosts.

16. The method of claim 15, wherein the second path is a path from a second initiator to the second target port, wherein the second initiator is included any of the first host and another host of the cluster.

17. The method of claim 16, further comprising:
registering the first path to the logical device using a first key; and
registering the second path to the logical device using the first key, wherein the first command specifies to use the first key in connection with performing an operation for any of existing registrations and existing reservations associated with criteria including the first key.

18. A system comprising:
a processor; and
a memory including code stored therein that, when executed, performs a method of processing commands comprising:
  receiving, from an initiator at a first data storage system, a first command over a first of a plurality of paths, the first command being directed to a logical device, wherein a first device of the first data storage system and a second device of a second data storage system are configured as a same logical device, the logical device, wherein the plurality of paths to the logical device includes the first path from the initiator to a first target port of the first data storage system and includes a second path to a second target port of the second data storage system, wherein both the first path and the second path are active paths at a same point in time over which I/Os are issued to the same logical device and wherein the first device and the second device are configured for automated data replication whereby writes to the logical device received at the first data storage system are written to the first device and automatically replicated to the second device and writes to the logical device received at the second data storage system are written to the second device and automatically replicated to the first device;
  determining whether the first command modifies any of registration and reservation state information and whether the first command is to be replicated on the second data storage system;
  responsive to determining that the first command modifies any of registration and reservation state information, performing first processing in accordance with the first command to update a first data container of the first data storage system, the first data container including registration and reservation information for the first data storage system; and
  responsive to determining that the first command is to be replicated on the second data storage system, performing second processing in accordance with the first command to update a second data container of the second data storage system, the second data container including registration and reservation information for the second data storage system.

19. A computer readable medium comprising code stored thereon that, when executed, performs a method of processing commands comprising:
  receiving, from an initiator at a first data storage system, a first command over a first of a plurality of paths, the first command being directed to a logical device, wherein a first device of the first data storage system and a second device of a second data storage system are configured as a same logical device, the logical device, wherein the plurality of paths to the logical device includes the first path from the initiator to a first target port of the first data storage system and includes a second path to a second target port of the second data storage system, wherein both the first path and the second path are active paths at a same point in time over which I/Os are issued to the same logical device and wherein the first device and the second device are configured for automated data replication whereby writes to the logical device received at the first data storage system are written to the first device and automatically replicated to the second device and writes to the logical device received at the second data storage system are written to the second device and automatically replicated to the first device;
  determining whether the first command modifies any of registration and reservation state information and whether the first command is to be replicated on the second data storage system;
  responsive to determining that the first command modifies any of registration and reservation state information, performing first processing in accordance with the first command to update a first data container of the first data storage system, the first data container including registration and reservation information for the first data storage system; and
  responsive to determining that the first command is to be replicated on the second data storage system, performing second processing in accordance with the first command to update a second data container of the second data storage system, the second data container including registration and reservation information for the second data storage system.

* * * * *